(12) United States Patent
Bleck

(10) Patent No.: US 10,932,018 B2
(45) Date of Patent: Feb. 23, 2021

(54) METHOD FOR REMOVING STATIC DIFFERENTIAL DELAYS BETWEEN SIGNALS TRANSPORTED OVER AN OPTICAL TRANSPORT NETWORK

(71) Applicant: ADVA Optical Networking SE, Meiningen OT Dreissigacker (DE)

(72) Inventor: Oliver Bleck, Geretsried (DE)

(73) Assignee: ADVA OPTICAL NETWORKING SE, Meiningen-Dreissigacker (DE)

(*) Notice: Subject to any disclaimer, the term of this patent is extended or adjusted under 35 U.S.C. 154(b) by 0 days.

(21) Appl. No.: 16/694,654

(22) Filed: Nov. 25, 2019

(65) Prior Publication Data

US 2020/0221195 A1 Jul. 9, 2020

(30) Foreign Application Priority Data

Jan. 4, 2019 (EP) .................... 19150296

(51) Int. Cl.
  *H01Q 11/00* (2006.01)
  *H04J 3/16* (2006.01)
  *H04Q 11/00* (2006.01)

(52) U.S. Cl.
  CPC ........ *H04Q 11/0067* (2013.01); *H04J 3/1652* (2013.01); *H04J 2203/0066* (2013.01); *H04Q 2011/0088* (2013.01)

(58) Field of Classification Search
  CPC ......... H04Q 11/0067; H04Q 2011/0088; H04J 3/1652; H04J 2203/0066
  See application file for complete search history.

(56) References Cited

U.S. PATENT DOCUMENTS

| | | | |
|---|---|---|---|
| 2015/0132012 A1* | 5/2015 | Furukawa | H04J 3/1652 398/154 |
| 2017/0118547 A1* | 4/2017 | West | G02B 6/4472 |
| 2018/0069732 A1* | 3/2018 | Sugawara | H04J 3/0691 |
| 2018/0175965 A1* | 6/2018 | Nakatsugawa | H04B 10/0775 |

FOREIGN PATENT DOCUMENTS

EP 2 876 836 A1 5/2015

OTHER PUBLICATIONS

Communication of the Extended European Search Report for European Patent Application Serial No. 19150296.2 (dated Jun. 17, 2019).

\* cited by examiner

*Primary Examiner* — Mina M Shalaby
(74) *Attorney, Agent, or Firm* — Jenkins, Wilson, Taylor & Hunt, P A.

(57) ABSTRACT

A method for removing static differential delays resulting from an independent transport of the client signals of a client signal bundle through an optical transport network, OTN, which comprises OTN mappers mapping received client signals to ODU signals transported to OTN demappers demapping received ODU signals to client signals, wherein a process slave, PS, at the OTN mapper end of said OTN network supplies continuously or in response to a received request information about timing relations between the client signals of said client signal bundle to a process master, PM, at the OTN demapper end of said OTN network used by the process master, PM, to remove the static differential delays between the client signals of the respective client signal bundle.

19 Claims, 16 Drawing Sheets

FIG 14
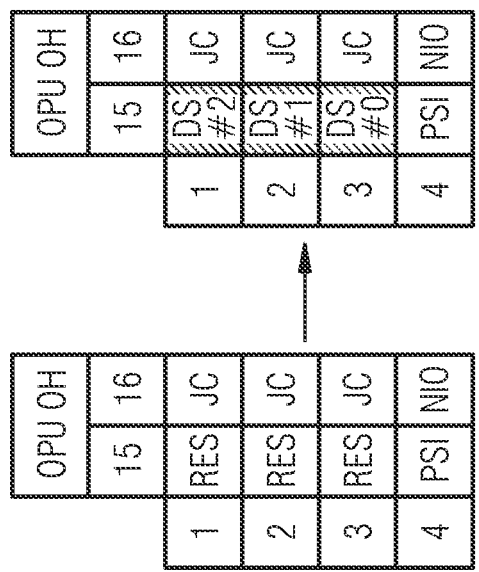
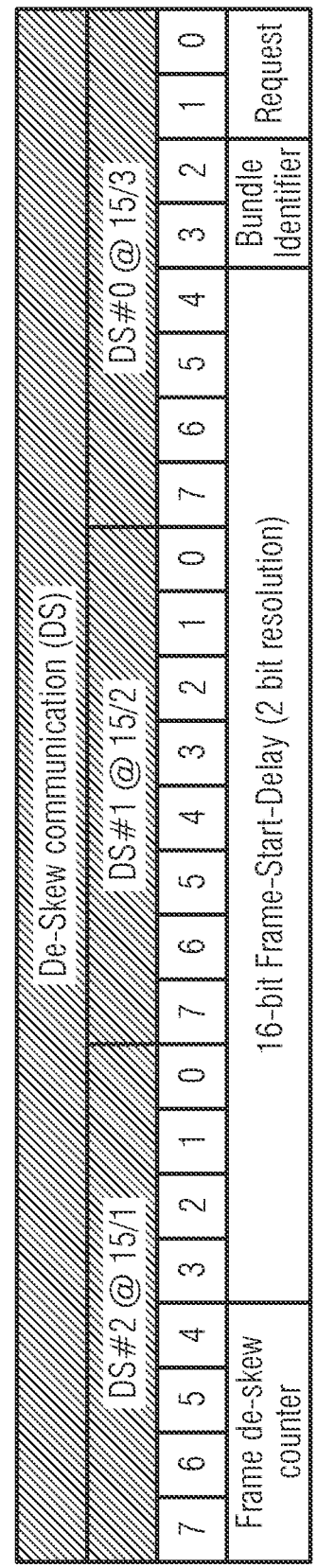

METHOD FOR REMOVING STATIC DIFFERENTIAL DELAYS BETWEEN SIGNALS TRANSPORTED OVER AN OPTICAL TRANSPORT NETWORK

CROSS REFERENCE TO RELATED APPLICATION

This patent application claims the priority benefit of European Patent Application Serial No. 19150296.2, filed Jan. 4, 2019, the disclosure of which is incorporated by reference herein in its entirety.

TECHNICAL FIELD

The invention relates to a method for removing static differential delays resulting from an independent transport of client signals of a client signal bundle through an optical transport network, OTN.

BACKGROUND

The Fibre Channel (FC) Interswitch Link (ISL) Trunking feature allows to bundle multiple Fibre Channel signals of the same transmission rate to provide an increased data throughput in an optical transport network OTN. In order to support that feature, a maximum amount of differential delay between Fibre Channel signals bundled in a client signal bundle must not be exceeded. Comparable requirements exist for other client signal types if not serialized before being transported over an optical transport network OTN such as a 4-lane Infiniband FDR-10.

A conventional OTN does not provide means to deskew differential delay accumulated between client signals transported individually over an OTN network. Therefore, a differential delay accumulated because of client signals being transported independently over an OTN network has to stay below the deskewing capabilities of the equipment terminating the respective client signal such as FC switches. As that capability to deskew may be low applying a FC ISL trunking feature to client signals transported over an OTN network may not be possible. Accordingly, there is a need to provide a method to remove static differential delays resulting from an independent transport of client signals of a client signal bundle through an optical transport network.

SUMMARY OF THE INVENTION

The invention provides according to the first aspect a method for removing static differential delays resulting from an independent transport of the client signals of a client signal bundle through an optical transport network which comprises OTN mappers mapping received client signals to ODU signals transported to OTN demappers demapping received ODU signals to client signals, wherein a process slave at the OTN mapper end of said OTN network supplies continuously or in response to a received request information about timing relations between the client signals of said client signal bundle to a process master at the OTN demapper end of said OTN network used by the process master to remove the static differential delays between the client signals of the respective client signal bundle.

In a possible embodiment of the method according to the first aspect of the present invention, the process master at the OTN demapper end of said OTN network generates a deskew request communicated by the process master at the OTN demapper end of said OTN network to the process slave at the OTN mapper end of said OTN network.

In a further possible embodiment of the method according to the first aspect of the present invention, the process slave at the OTN mapper end of said OTN network provides in response to the deskew request received from the process master at the OTN demapper end of said OTN network an acknowledgement.

In a further possible embodiment of the method according to the first aspect of the present invention, the acknowledgement provided by the process slave at the OTN mapper end of said OTN network comprises information about timing relations between alignment markers associated with the client signals of the client signal bundle communicated by said process slave to said process master.

In a further possible embodiment of the method according to the first aspect of the present invention, the static differential delays between the client signals of the respective client signal bundle are removed by the process master in response to the received acknowledgement on the basis of the timing relation between the alignment markers.

In a still further possible embodiment of the method according to the first aspect of the present invention, the generation of the deskew request by the process master at the OTN demapper end of said OTN network is triggered autonomously by an event detected at the OTN demapper end of said OTN network or triggered by a user request.

In a still further possible embodiment of the method according to the first aspect of the present invention, the process master at the OTN demapper end of said OTN network stops sending the deskew request after the removal of the static differential delays has been performed by the process master.

In a still further possible embodiment of the method according to the first aspect of the present invention, the client signals form part of a configured client signal bundle identified by a bundle ID carried in the deskew request.

In a still further possible embodiment of the method according to the first aspect of the present invention, the process slave provides the acknowledgement if the received deskew request has been determined by the process slave to form a valid deskew request.

In a still further possible embodiment of the method according to the first aspect of the present invention, the process master disables transport of client signals forming part of the respective client signal bundle as long as the acknowledgement is received by the process master.

In a still further possible embodiment of the method according to the first aspect of the present invention, alignment markers forming part of the mapped ODU signals are synchronized to each other by the process slave in response to the received deskew request before the acknowledgement is provided by the process slave to said process master.

In a still further possible embodiment of the method according to the first aspect of the present invention, the alignment markers comprise Frame Start Signal, FS, markers and/or a MultiFrame Start Signal, MFS, markers.

In a still further possible embodiment of the method according to the first aspect of the present invention, timing relations between the alignment markers of all client signals of a client signal bundle mapped by the OTN mapper are determined by the process slave at the mapper end of the OTN network in response to a valid deskew request received from the process master at the demapper end of said OTN network to generate a timing relation snapshot communicated by the process slave along with the acknowledgement to the process master used to remove static differential delays between the respective client signals.

In a still further possible embodiment of the method according to the first aspect of the present invention, the process slave at the OTN mapper end of said OTN network further communicates a deskew frame counter value to the process master at the OTN demapper end of said OTN network inserted in the ODU signals transporting a mapped client signal of the respective client signal bundle to the OTN demapper of said OTN network.

In a still further possible embodiment of the method according to the first aspect of the present invention, portions of the client signals of the respective client signal bundle are replaced before being mapped by the OTN mapper by the process slave at the OTN mapper end of said OTN network by inserted synchronized cyclically repeated alignment markers in response to a deskew request received from the process master at the demapper end of said OTN network to establish identifiable timing relations between the client signals of the respective client signal bundle used by the process master to remove static differential delays between the respective client signals.

In a still further possible embodiment of the method according to the first aspect of the present invention, before mapping by the OTN mapper by the process slave at the mapper end of said OTN network regardless of receiving a valid deskew request or not, synchronized cyclically repeated alignment markers are inserted to establish identifiable timing relations between the client signals of the respective client signal bundle used by the process master to remove static differential delays between the respective client signals.

In a still further possible embodiment of the method according to the first aspect of the present invention, the deskew request and the acknowledgement are transported between the process master at the OTN demapper end of said OTN network and the process slave at the OTN mapper end of said OTN network in a communication channel using allocated bytes of the OPU overheads, the ODU overheads and/or the OTU overheads.

In a still further possible embodiment of the method according to the first aspect of the present invention, the client signals are provided by a client equipment comprising a signal switch or a signal router.

The invention provides according to the second aspect an optical transport network comprising OTN mappers adapted to map received client signals of a client signal bundle to ODU signals transported to OTN demappers of said OTN network and adapted demap received ODU signals to client signals, wherein a process slave at the OTN mapper end of said OTN network is configured to supply continuously or in response to a received request information about timing relations between the client signals of said client bundle to a process master at the OTN demapper end of said OTN network used by the process master to remove static differential delays between the client signals of the respective client signal bundle.

In a possible embodiment of the optical transport network according to the second aspect of the present invention, the client signals are provided by client equipment of said OTN network.

BRIEF DESCRIPTION OF THE FIGURES

In the following, possible embodiments of the different aspects of the present invention are described in more detail with reference to the enclosed figures.

FIG. 14 shows a schematic diagram for illustrating a communication overhead used in a further exemplary embodiment of the method and optical transport network according to the present invention;

DETAILED DESCRIPTION OF EMBODIMENTS

Figure 1:
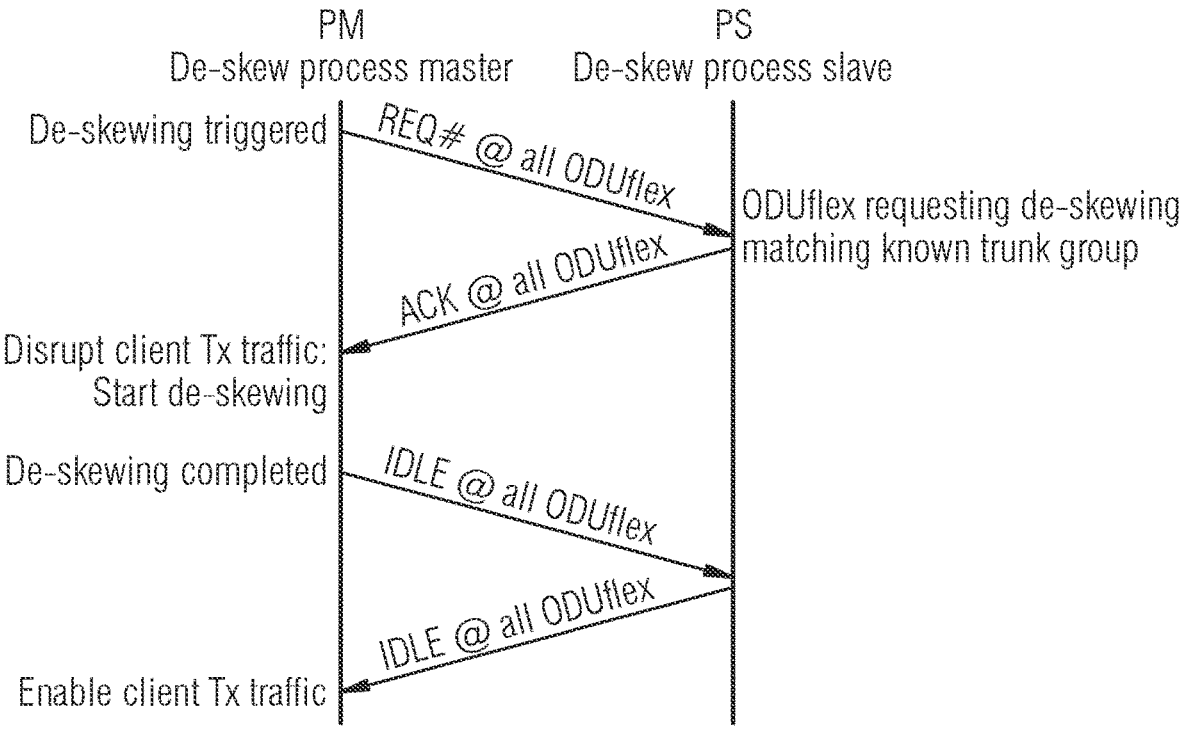
FIG. 1 shows a signal diagram for illustrating a possible exemplary embodiment of a method for removing static differential delays according to an aspect of the present invention.

In an optical transport network, optical network elements can be connected by optical fiber links. The optical network elements can provide functionality of transporting, multiplexing, switching, management and supervision of optical channels carrying client signals. The optical transport network OTN can use wavelength division multiplexed WDM signals. Client signals can be carried over an optical transport network OTN in a transparent manner. The client equipment can be connected to the optical transport network OTN. The client signals can comprise ODU client signals and non-ODU client signals. The non-ODU client signals comprise e.g. Ethernet, Fibre Channel (FC), and/or Infiniband along other signals. Client signals can form part of a client signal bundle. The client signals can be provided by a client equipment such as a signal switch or a signal router. The optical transport network OTN comprises OTN mappers mapping received client signals to ODU signals. The ODU signals are transported to OTN demappers adapted to demap received ODU signals back to client signals.

In an optical transport network OTN according to an aspect of the present invention, a process slave PS at the OTN mapper end of the OTN network supplies continuously or in response to a received request information about timing relations between the client signals CS of a client signal bundle CSB to a process master PM at the OTN demapper end of the OTN network wherein the information is used by the process master PM to remove the static differential delays between the client signals of the respective client signal bundle CSB. With the method and network according to the present invention, it is possible to remove static differential delays accumulated because of individual client signals CS having been transported independently over the OTN network. This allows for instance to support FC ISL Trunking feature removing constraints to its usability because of the client signals being transported individually over the OTN network.

In a possible embodiment, at the OTN mapper end, a timing relationship present between non-OTN signals bundled in a client signal bundle is determined or a defined timing relationship is enforced. A timing marker and, if necessary, a determined timing relationship can be communicated in a possible embodiment to the OTN demapper end. At the OTN demapper end, the timing difference between timing marker reception can be determined and used to configure deskew buffers in such a way that the timing relationship between client signals bundled at the egress of the OTN demapper does match the timing relationship that has been present or got enforced at the OTN mapper end. The method according to the present invention can be applied to any client signal bundle whose individual client signals are bit-synchronously mapped (BMP) into an ODUk signal where the ODUk signal is either aggregated as LO ODUk of an OTN multiplex structure or transported as HO ODUk of an OTUk signal. Another kind of mapper than the BMP mapper can be applied utilizing alignment marker insertion. Further, it can be possible to adapt concepts for information exchanged between the OTN mapper and the OTN demapper.

Removing static differential delay between client signals transported individually (i.e. mapped/multiplexed separately) requires information about the client signal bundle skew removal at the mapper end and demapper end, information about the timing correlation between the bundled client signals at the OTN mapper end and information about the timing correlation between the bundled client signals at the OTN demapper end.

To include as many intermediate OTN functions as possible determining respective timing correlation information occurs in a possible embodiment as close as possible to the non-OTN signal receive function at the OTN mapper end and as close as possible to the non-OTN signal transmit function at the demapper end. The method for removing static differential delays can be triggered autonomously or upon a specific user request. An autonomous trigger can be determined at the OTN demapper end, in particular by a process master PM at the OTN demapper end of the OTN network. In a further possible embodiment, the method according to the present invention is triggered upon a specific user request at the OTN de-mapper end of the OTN network.

The method and network according to the present invention can be implemented by different exemplary embodiments to provide different solutions to remove a differential delay accumulated between client signals CS of a client signal bundle CSB transported individually over an OTN network. Different embodiments can differ in how a timing relationship between the client signals of a client signal bundle at the OTN mapper end is determined and/or communicated to the OTN demapper end of the OTN network. The different embodiments require a flexible buffer implementation at the OTN demapper end capable of retrieving data from a buffer at a position determined by the method according to the present invention, i.e. retrieve data from the buffer after a determined delay with the extraction point differing for all client signals of a client signal bundle.

In a possible embodiment, the method according to the present invention relies on a synchronized Frame Start (FS) signal/MultiFrame Alignment Signal (MFAS) value being generated for all mappers involved. If the Frame Start signal and/or MultiFrame Alignment Signal value are not synchronized at the time of triggering the method to remove static differential delays, they can in a possible embodiment be forcefully synchronized.

In a further possible embodiment, the method according to the present invention does not rely on a synchronized FS signal/MFAS value but requires additional complexity to communicate the timing relations as present at the OTN mapper end at the time of triggering the process to remove skew, i.e. differential delay. This embodiment can be adapted to include skew originating from asynchronous mapping/demapping in a skew removal process.

Further embodiments of the method according to the present invention do not rely on a synchronized FS signal/MFAS value and neither do they rely on a complex timing relationship communication. These embodiments can be applied to synchronous as well as asynchronous mappers. In a possible embodiment, the skew compensation is continuously controlled. This requires additional bandwidth to be available at the transport equipment to continuously communicate the timing relations.

FIG. 1 shows a diagram for illustrating a skew removal process according to a possible exemplary embodiment of the method according to the first aspect of the present invention. The skew removal process illustrated in FIG. 1 can be used to remove static differential delays resulting from an independent transport of client signals CS of a client signal bundle CSB through an optical transport network OTN. FIG. 1 shows in a signal diagram the communication between a deskew process master PM and a deskew process slave PS. The process slave PS can be located at the OTN mapper end of the OTN network and the process master PM can be located at the OTN demapper end of the OTN network. In the embodiment illustrated in FIG. 1, the process master PM upon being triggered starts communicating a request REQ to deskew to the peer end. The process master PM communicates the request REQ to deskew for any signal configured to be part of the client signal bundle. As the same equipment may support multiple client signal bundles CSB at the same time, it may be beneficial to support the request REQ to deskew to be made for a specific client signal bundle identified by a unique bundle identifier BID. The bundle identifier BID is configured with the same value at either end of the OTN transport network. By defining a unique bundle identifier BID, it is possible to support simultaneously triggered deskewing processes for multiple client signal bundles CSB as they may occur on the same equipment in case of autonomous triggering. As illustrated in FIG. 1, the process master PM located at the OTN demapper end of the OTN network generates the deskew request REQ communicated by the process master PM located at the OTN demapper end of said OTN network to the process slave PS at the OTN mapper end of the OTN network.

As long as the process slave PS does not respond to the request to deskew REQ provided by the process master PM, the process master PM does not carry out any further action than continue to communicate the request REQ to deskew.

Upon an end receiving the request REQ to deskew from the process master PM at a first ODUk signal configured to transport a client signal bundle CSB that end becomes the process slave PS. As a first substep, it is possible that the process slave PS first determines whether a received request REQ is a valid request or not. For the request REQ to be evaluated as a valid one, the process slave PS has to receive the request REQ at ODUk signals configured at the process slave's end to transport client signals bundled within a defined amount of time. In a possible embodiment, the validation time is defined in such a way that it is slightly higher than the maximum differential delay which may be removed by the deskew process. This ensures that the request REQ may be properly received via the path suffering from the highest delay.

If the concept of a unique bundle ID BID is supported by the system, the validation of the request REQ may be further enhanced by checking the request REQ not only to be made within a defined timeout but to be received at the same members or client signals bundled at the process slave PS with the same bundle ID BID. If after validation the request REQ to deskew has been received for more, less or different ODUk signals than configured at the process slave's end to transport client signals of a client signal bundle with the same bundle ID BID (if supported), the request REQ is declared as invalid. An invalid request REQ may be determined because of the transport delay difference accumulated over the OTN network between client signals bundled exceeding the deskewing capabilities of the process or—in case of BID being supported—differing client signal bundles being configured at the process master's and/or process slave's end.

In case that the process slave PS determines the received request REQ to be an invalid one, it will maintain traffic transport and does communicate a denial of the request REQ to the process master PM.

In contrast, if the process slave PS determines in a possible embodiment that the received request REQ is a valid request, it can carry out steps required to support the deskewing process and can communicate an acknowledgement ACK of the request REQ back to the process master PM as also illustrated in the signal diagram of FIG. 1.

The process slave PS communicates a denial or an acknowledgement ACK back to the process master PM at any ODUk signal it received the request REQ to deskew from. In case of a denial being communicated, the ODUk signals at which the denial is communicated may not match a bundle configuration at the process slave's end. In case that an acknowledgement ACK is communicated, the bundle of ODUk signals at which the acknowledgement ACK is communicated will match the bundle configuration at the process slave's end.

Communicating the bundle ID BID—if supported—as part of the denial/acknowledgement is not necessary as a second bundle validation will not be required from the process master PM.

In an alternative embodiment no validation is performed and the process slave PS does always send an acknowledgement after having carried out applicable actions.

The process slave PS does continue to communicate the denial or acknowledgement ACK as applicable until the process master's request REQ to deskew is no longer received at any of the ODUk signals the request REQ to deskew has been received for. Once the request REQ to deskew is no longer received, the process slave PS does stop to communicate the denial/acknowledgement and any information which may accompany it thus concluding the deskewing process at the process slave's end.

If a denial is received at a first ODUk signal transporting the client signals of a client signal bundle CSB, the process master PM requested the deskewing for, the process master PM does stop communicating the request REQ for any client signal thus concluding the deskewing process as having failed at the process master's end. In an alternative embodiment, the process master PM can wait to receive the denial at all ODUk signals.

If an acknowledgement ACK has been received at a first ODUk signal transporting the client signals of a client signal bundle, the process master PM requested the deskewing for, it may be beneficial for the process master PM to disable traffic transport of any signal configured as forming part of the client signal bundle CSB carrying out consequent actions as applicable for the signal. Disabling or disrupting the traffic transport as illustrated in the signal diagram of FIG. 1, may be beneficial to force the connected equipment to resynchronize itself after a deskewing process has been concluded. In a possible embodiment, the traffic transport is disabled immediately and does not wait on all client signals CS of a client signal bundle CSB at the process master's end to receive an acknowledgement ACK. In an alternative embodiment, the process master PM can also wait to receive the denial at all ODUk signals. Receiving the acknowledgement ACK at one mapper only suffices as it implies that the process slave PS successfully validated the bundle configuration so the acknowledgement ACK is expected to be received for all signals at the process master's end eventually. If in an alternative embodiment validation is not provided by the process slave PS, the Process master PM does wait on receiving an acknowledgment ACK for all signals. After disabling traffic transport (if supported), the process master PM can carry out the deskewing process. After the deskewing is applied, the process master PM stops sending the request REQ to deskew, thus concluding the deskewing process as also illustrated in the signal diagram of FIG. 1.

Once the acknowledgement ACK is no longer received at any ODUk signal transporting the client signals CS of a client signal bundle CSB at the process master's end, the process master PM can enable traffic transport again (if disabled) thus concluding the process at the process master's end as also illustrated in the signal diagram of FIG. 1. As can be seen in the embodiment illustrated in FIG. 1, the process slave PS at the OTN mapper end of the OTN network provides in response to the deskew request REQ received from the process master PM at the OTN demapper end of the OTN network an acknowledgement ACK communicated by the process slave PS back to the process master PM. This acknowledgement ACK can comprise in a possible embodiment information about timing relations between alignment markers associated with the client signals CS of the client signal bundle CSB. In a possible alternative embodiment, the acknowledgement ACK by itself represents information enough as the means to determine the amount of deskew is known by the process master PM beforehand. In this embodiment, the process master PM only needs to know that synchronization of the known marker is assured and deskewing may be applied based on that knowledge. In the embodiment illustrated in FIG. 1., the static differential delays between the client signals CS of the respective client signal bundle CSB are removed by the process master PM in response to the received acknowledgement ACK on the basis of the timing relation between the alignment markers.

The generation of the deskew request REQ by the process master PM at the OTN demapper end of said OTN network can be either triggered autonomously by an event detected at the OTN demapper end of the OTN network or can be triggered by a user request. The process master PM at the OTN demapper end of the OTN network does stop sending the deskew request REQ after the removal of the static differential delays has been performed by the process master PM. In a possible embodiment, the process slave PS provides the acknowledgement ACK only if the received deskew request REQ has been determined by the process slave PS to form a valid deskew request REQ. In the illustrated embodiment of FIG. 1, the process master PM disables transport of client signals CS forming part of the respective client signal bundle CSB as long as the acknowledgement ACK is received by the process master PM.

Figure 2:
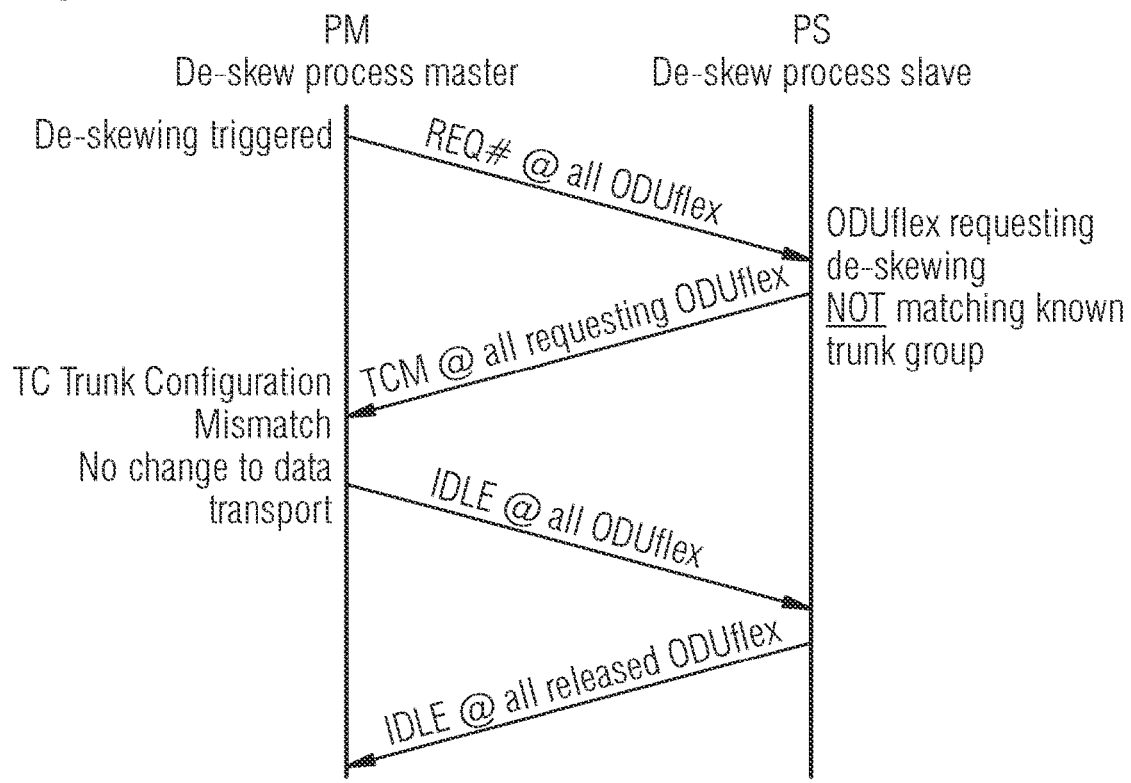
FIG. 2 shows a further signal diagram for illustrating a further possible exemplary embodiment of a method for removing static differential delays according to an aspect of the present invention.

The signal diagram of FIG. 1 illustrates a case where the ODUflex requesting deskewing do match a known trunk group. In contrast, FIG. 2 shows a case where the ODUflex requesting deskewing do not match a known trunk group.

In a possible embodiment, the method according to the present invention relies on a synchronized Frame Start (FS) signal and/or MultiFrame alignment signal (MFAS) value generated for the ODUk signals by all mappers at the process slave's end to be synchronized. In the embodiment, alignment markers forming part of the mapped ODU signals can be synchronized to each other by the process slave PS in response to the received deskew request REQ before the acknowledgement ACK is provided by the process slave PS to said process master PM. In the embodiment, the alignment markers can comprise Frame Start signal, FS, markers and/or MultiFrame start signal, MFAS, markers.

In this embodiment, the time relationship between all ODUk signals at the process slave's mapper end present at the time of carrying out the deskewing is known to the process master PM, thus enabling the process master PM to achieve equalized transport delays for all client signals CS of a client signal bundle CSB by delaying individual client signals as applicable to match the timing relationship present at the process slave PS.

If the process according to the present invention is applied to signals timed from the same reference clock, forcefully synchronizing FS signal and MFAS value at the process slave's mapper may only be required if the deskewing process is triggered a first time, a member is added to the client signal bundle CSB and/or after individual members of a client signal bundle CSB have been lost and a hold-over clock having drifted too far before the signal is recovered.

In a possible embodiment of the deskewing process, a service affecting action may be provided to ensure that the connected equipment can be resynchronized.

Figure 3:
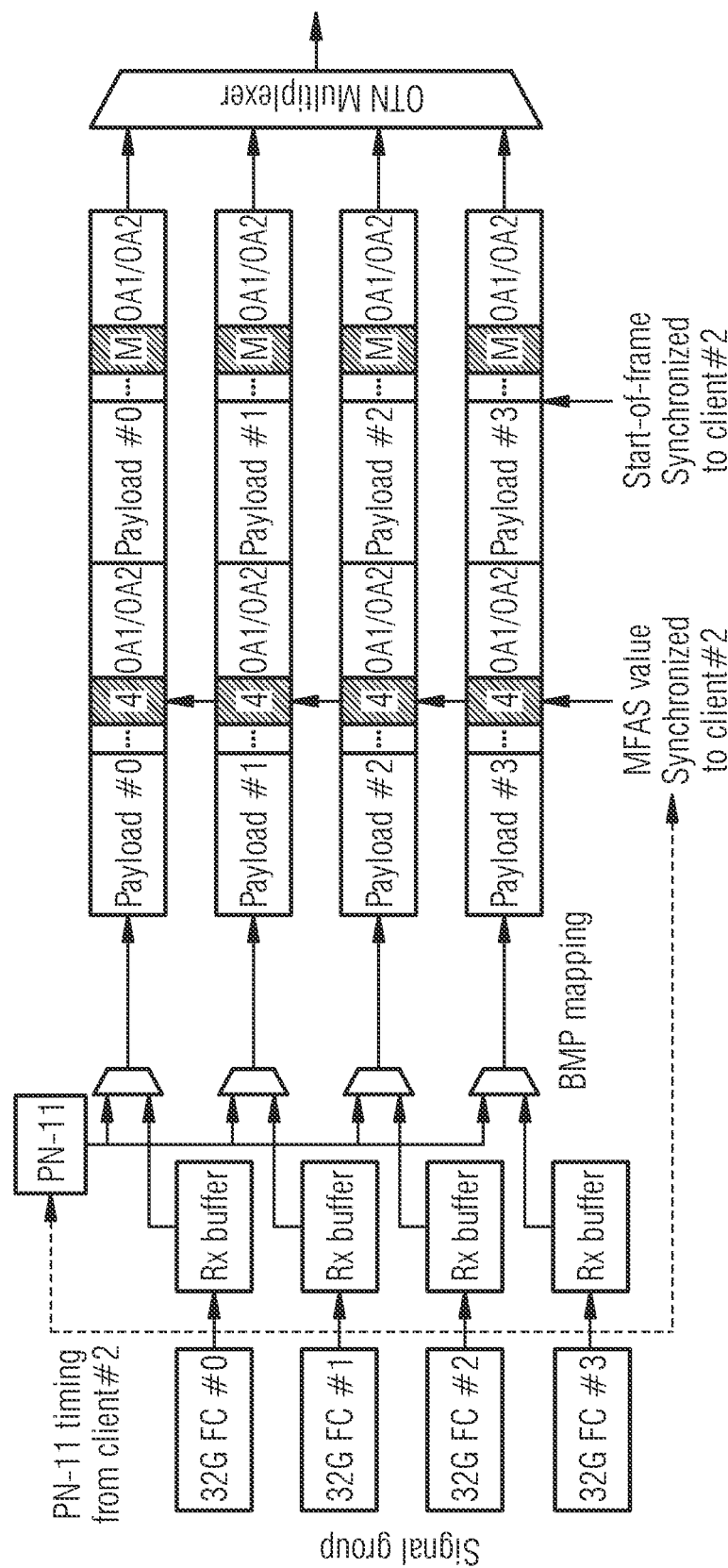
FIG. 3 shows a diagram for illustrating the operation behaviour of a process slave within an optical transport network according to an aspect of the present invention.

FIG. 3 shows schematically the operation behaviour of a process slave PS in an embodiment where the method relies on FS markers and/or MFAS values.

Once the process slave PS determines a valid request REQ to deskew, it can be determined whether the FS signal/MFAS value generated by all involved mappers are synchronized. If the FS signal/MFAS value are not synchronized, the process slave PS can forcefully align the Frame Start (FS) signal/MultiFrame Alignment Signal (MFAS) value generated by all involved mappers. What reference is used to align all FS/MFAS values is not relevant. It is not required to reset the MFAS value to 0 (i.e. synchronize the MultiFrame Start Signal MFS). Synchronizing the MFAS value to any value is sufficient for the preferred embodiment of the process master functions.

By synchronizing the FS signal/MFAS value of all ODUk signals transporting the client signals CS of a client signal bundle CSB, a known predetermined timing relationship between the ODUk signals is established.

In case of a BMP mapper, the timing relationship known between the ODUk signals of a client signal bundle CSB will be the same as the timing relationship between the non-OTN signals mapped as long as all non-OTN signals are timed by the same clock domain.

Although not being strictly required, it is preferred for the process slave PS to replace the non-OTN signals mapped with a known replacement pattern for the duration of the deskewing process, e.g. a PN-11 pattern per ITU-T G.709 clause 16.6.1. The timing for the replacement pattern can be locally generated or derived from any signal replaced.

As long as a non-OTN signal is replaced (i.e. it has not failed at the time the deskewing process has been triggered), it may be beneficial to derive the timing of the replacement pattern for all signals from the non-OTN signal whose mapper has been selected as a reference to synchronize FS and MFAS.

Replacing all signals with a replacement pattern timed from a single clock source can assure that in use cases of incorrect configurations of a client signal bundle CSB (i.e. not all non-OTN signals may be timed from the same reference clock), the process master PM may still rely on a common timing relationship between all ODUk signals received as would be the case for synchronized non-OTN signals.

The process slave PS does synchronize FS signal/MFAS value as well as replace the signal mapped—if applicable—before communicating the acknowledgement ACK to the process master PM. It will do so as the process master PM will rely on the aligned timing relationship being present at the time of receiving the acknowledgement ACK in order to carry out the deskewing successfully.

The process slave PS does keep the timing of all mapper at the client signal bundle CSB locked to the same timing source (if supported that way) as long as it receives the request REQ to deskew from the process master PM.

Once the process slave PS no longer receives the request REQ to deskew at any ODUk signal transporting the client signals of the client signal bundle CSB, it can release the timing lock between the mapper (if supported), map the non-OTN signals and then stops communicating the acknowledgement ACK.

Figure 4:
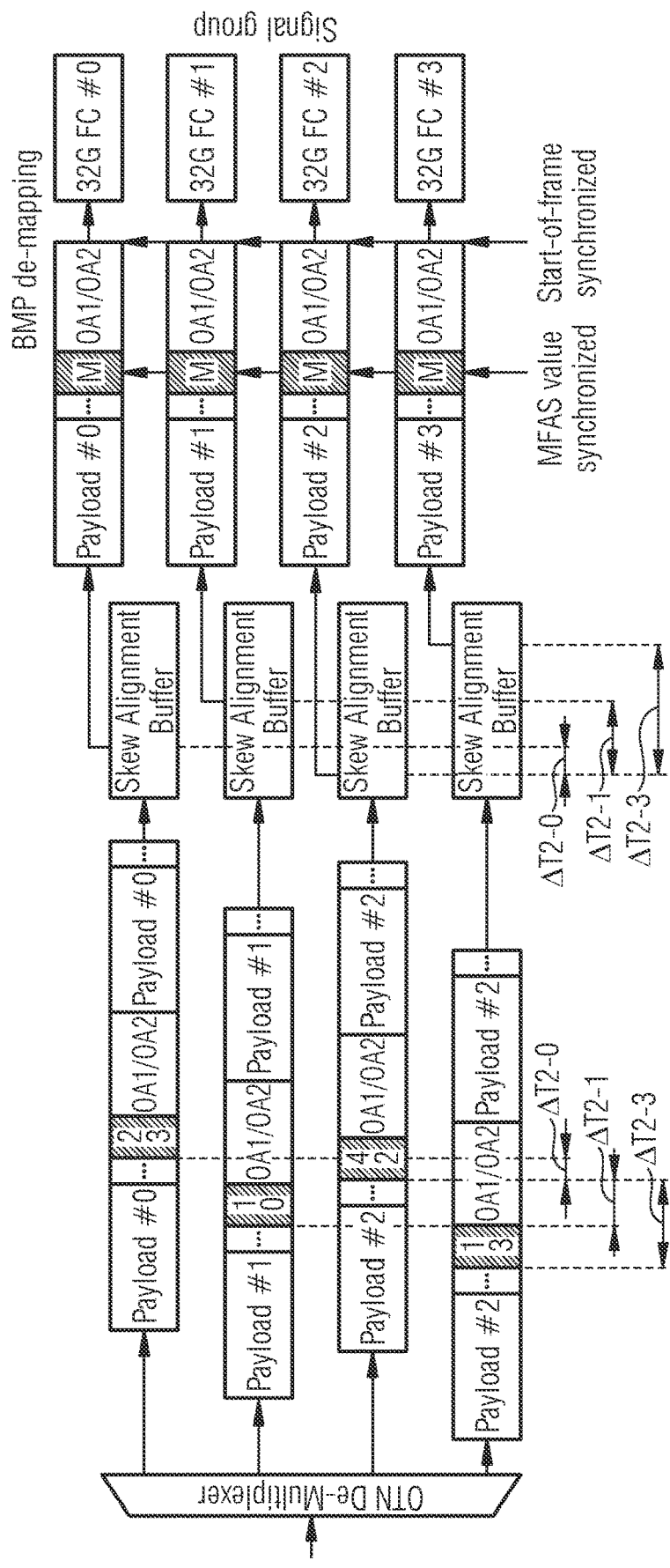
FIG. 4 shows a schematic diagram for illustrating the operation behaviour of a process master within an optical transport network according to an aspect of the present invention.

FIG. 4 shows a schematic diagram for illustrating an operation behaviour of a process master PM in the embodiment achieving known timing relationships by synchronizing FS/MTAS.

Once the process master PM receives an acknowledgement ACK at ODUk signals transporting signals of the client signal bundle CSB it requested the deskewing for, it may determine the timing relationship between all ODUk signals.

Receiving the acknowledgement ACK at all ODUk signals can be delayed as for any ODUk signal whose FS signal/MFAS value required to be synchronized by the process slave PS, the process master PM may detect a brief Loss of Frame (LOF)/Loss of Multiframe (LOM) condition because of the FAS/MFAS bytes suddenly being located differently.

The process master PM as illustrated in FIG. 4 can determine the amount of delay to remove per ODUk signal path from the relative difference of the FS positions as well as the relative difference of frames between ODUk signals (difference in MFAS value) from the process slave PS.

As the process slave PS did synchronize the FS signal/MFAS value prior to communicating the acknowledgement ACK, any difference between FS and MFAS value determined by the process master PM forms a direct measure of the differential delay between the ODUk signals transporting the client signals CS of a client signal bundle CSB accumulated because of their transport through the OTN transport network.

The process master PM as illustrated in FIG. 4 can use the differential delay determined to configure the deskew buffer extraction point for each ODUk signal transporting client signals CS of a client signal bundle CSB in such a way that the FS signal/MFAS value of all ODUk signals will be synchronized to each other again thus matching the timing relationship as present at the process slave PS.

To harden the process against any bit errors falsifying the MFAS value, in a preferred implementation, it may be beneficial to validate the MFAS value retrieved, e.g. by waiting to receive three consecutive values in three consecutive frames of the respective ODUk signal.

As long as the differential delay between ODUk signals does not exceed in a possible implementation 127 frame periods, the process master PM may deskew signals without any further means as for any given set of MFAS values received it is known which signals to delay relative to the one with the least delay. However, differential delay in excess of e.g. 127 frame periods may be deskewed if the process slave PS additionally inserts a dedicated deskewing counter with a different cycle (e.g. 0 . . . 239) which is aligned with the MFAS periodically (e.g. a 0 . . . 239 counter aligned to deskew counter=MFAS=0 every 3840 frames). In such a case, a maximum differential delay up to 1919 frames can be deskewed.

Once the relative delay has been determined for all ODUk signals with an accuracy of one frame period, the exact relative delay can be determined by including the FS offset between the ODUk signals.

If the MFAS of some ODUk signal received cycles before the ODUk signal with the highest transport delay has been received a first time with the acknowledgement ACK, the respective frame period counter is merely kept being increased (instead of computing the differences by means of comparing the MFAS values which limits the deskewing capabilities).

After configuring the deskew buffer as required, the process master PM does stop communicating the request REQ to deskew. Once the process master PM receives no more acknowledgement ACK for any client signal CS of the client signal bundle CSB, it can enable traffic transport again.

The process does remove the differential delay at the process master PM demapper only, i.e. it forms a process affecting only a single transport direction.

In a further possible embodiment of the method and network according to the present invention, the process does not rely on a synchronized FS signal/MFAS value but requires additional complexity to communicate any timing relationship as present at the mapper at the time of triggering the process to remove skew. In this embodiment, the known timing relationship is achieved by communicating a timing relationship snapshot. This is also illustrated by FIGS. 5, 6.

By communicating the timing relationship present at the time of a snapshot, a known timing relationship between client signals CS of a client signal bundle CSB can be made available to the process master PM.

Figure 5:
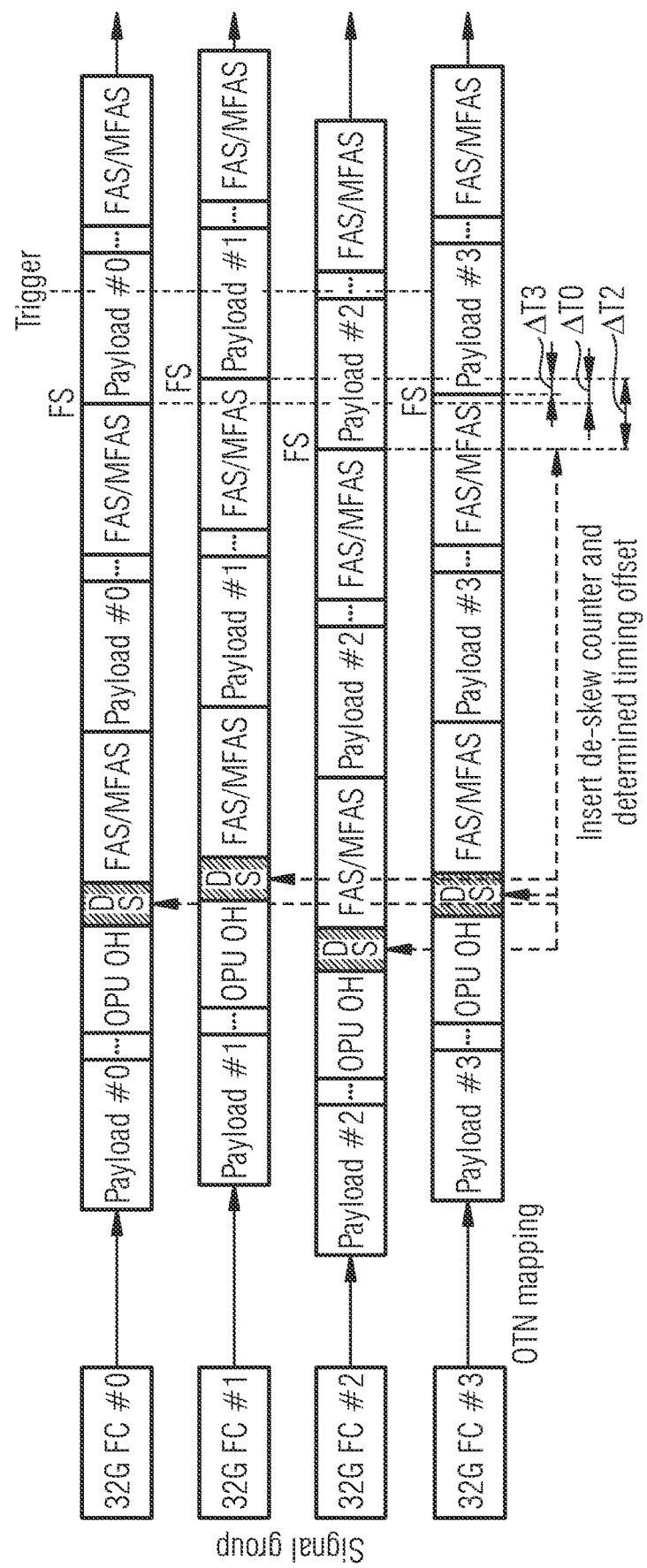
FIG. 5 shows a further schematic diagram for illustrating the operation behaviour of a process slave in a further possible embodiment of an optical transport network according to the present invention.
Figure 6:
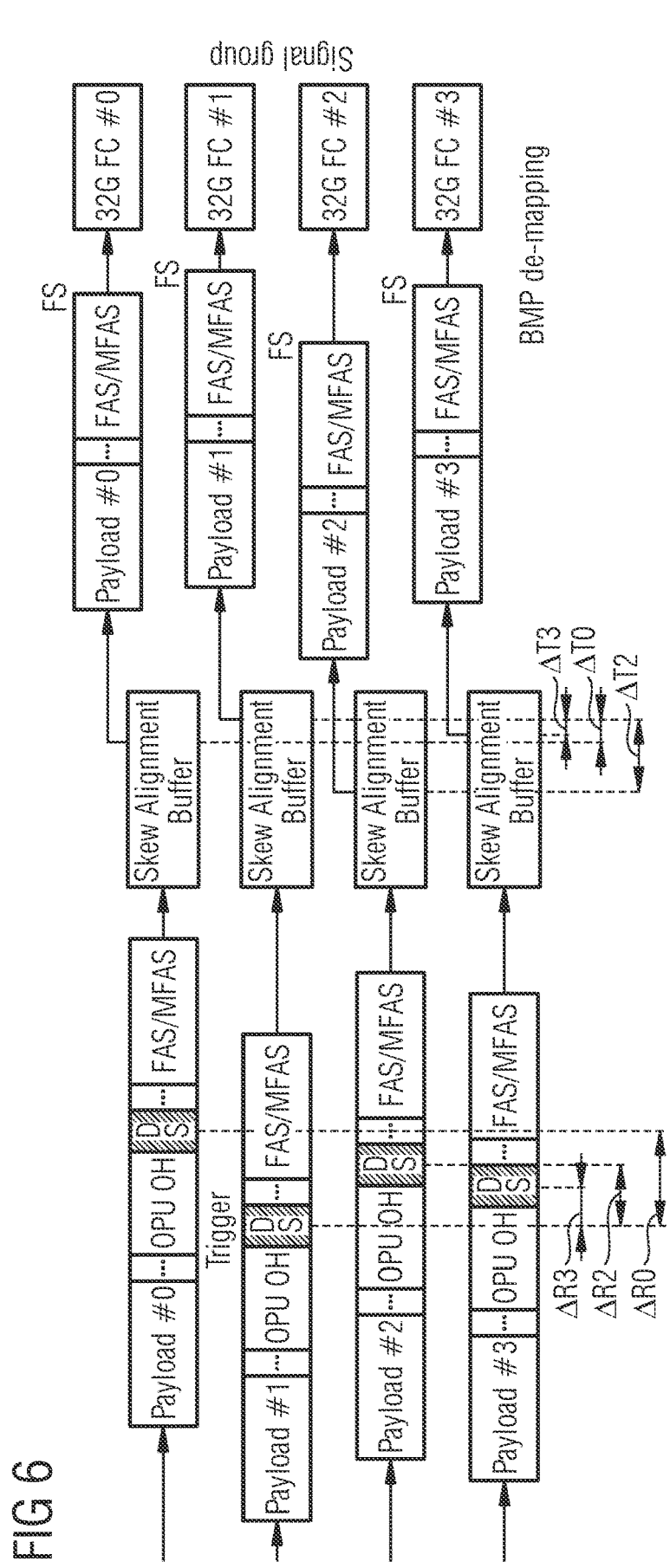
FIG. 6 shows a schematic diagram for illustrating the operation behaviour of a process master in a possible embodiment of the optical transport network according to an aspect of the present invention.

FIG. 5 illustrates the operation behaviour of a process slave PS in this embodiment using a timing snapshot.

Once the process slave PS determines a valid request REQ to deskew, it can determine the timing relationship between all client signals CS of a client signal bundle CSB at that point in time (time of the snapshot).

To determine the timing relationship at the time of the snapshot, the process slave PS can first identify a timing reference any timing information communicated to the process master PM will be referenced to.

Any ODUk signal a client signal CS of a client signal bundle CSB is mapped into may be defined as being the timing reference. It can be beneficial to define the ODUk signal with the next FS after the process slave PS has determined the validity of the request REQ from the process master PM as the timing reference. In case the ODUk signal with the next FS signal may not be unambiguous (e.g. as the FS of multiple ODUk signals are synchronized), any one may be defined as the timing reference.

The process slave PS illustrated in FIG. 5 can determine a delay between the FS of the chosen timing reference and the next FS occurrence of any other ODUk signal. The delay determined thus for each ODUk signal is then communicated to the process master PM.

As the delay between any two ODUk signals FS occurrence cannot exceed one frame period (as only signals of the same data rate will be bundled), the accuracy of the information communicated relies on the amount of bits available to communicate the determined delay. For example, in case of 2 bytes being available, a 1-bit resolution of the delay cannot be provided with an ODUk frame consisting of e.g. 4*3824*8 bits. To achieve a 1-bit resolution, 17 bits are required to be able to code and communicate any possible relative delay value.

An all-1 pattern can be used as a relative delay value for the ODUk signal defined being the reference signal. This allows the process master PM to easily identify it as being the timing reference all other values determined need to be referenced to (the decimal value of an all-1 pattern will not match any valid value range of the relative FS delay). The relative delay value of any other ODUk signal with simultaneous FS occurrence—relative to the timing reference—can be coded as an all-0 pattern, i.e. no relative delay.

After having determined and coded all relative FS delay values, the process slave PS as illustrated in FIG. 5 can start to communicate the acknowledgement ACK as well as the coded relative FS delay determined for the respective ODUk signal.

As the differential delay accumulated over the OTN transport network may exceed one frame period, communicating the coded relative delay between the FS is not sufficient for the process master PM to determine the required amount of deskew for all client signals.

The process slave PS can therefore communicate an additional deskew frame counter increased frame-by-frame (i.e. with each next FS signal to the ODUk signal). It can be beneficial in a possible embodiment to start counting at 1 to allow the process master PM to easily identify the deskew frame counter to be counting as communication will have to use otherwise reserved bytes which would contain an all-0 value according to standard requirements. The deskew frame counter value is inserted at any ODUk signal transporting a signal of the client signal bundle CSB although the exact time of communication may be delayed by the relative delay of the FS for each ODUk signal.

As the deskewing process at the process master PM does not rely on the deskewing frame counter value to determine the differential transport delay between ODUk signals but determines it by comparing the timing relationship between the same counter value occurring for a first time, the deskew frame counter does not need to be e.g. an 8 bit counter.

The process master PM may continuously watch out to start receiving ODUk signals with acknowledgement ACK and determine a differential delay based on that occurrence. By communicating the exact timing relationship between all ODUk signals transporting the signals of a client signal bundle CSB at a specific point in time to the process master PM, a known target timing relationship to recover between all client signals bundled becomes known to the process master PM.

Using an aligned MFAS value as an alternative to the additional deskew frame counter may be possible but requires a synchronized MFAS value between all client signals CS of a client signal bundle CSB with respective consequences on OTN functions relying on the MFAS controlled multiframe period.

As an alternative instead of aligning the MFAS value, the offset between MFAS values may be communicated as well. However, such an offset would require any value up to e.g. 255 to be communicated, hence, it would not provide any advantage over directly communicating an additional deskew frame counter of e.g. 8 bit length.

As the FS signal/MFAS value are not changed/synchronized by the embodiment and neither does it lock the timing between ODUk signals (it remains being determined as applicable for the mapper), no impact on traffic transport does occur because of an action of the process slave PS. Furthermore, there is no benefit in replacing the client signal CS for the duration of the deskewing process in this embodiment. The process master PM interrupting the data traffic transport remains beneficial. Once the process slave PS no longer receives the request REQ to deskew for any signal of the client signal bundle CSB it stops communicating the acknowledgement ACK.

FIG. 6 illustrates an operation behaviour of a process master PM in the embodiment achieving a known timing relationship by communicating a timing relationship snapshot.

Once the process master PM illustrated in FIG. 6 receives an acknowledgement ACK of all ODUk signals transporting client signals of a client signal bundle CSB it requested deskewing for, it can determine the timing relationship between all ODUk signals.

The process master PM can determine the delay between the first ODUk signal received with a non-zero deskew frame counter value and any other ODUk signal received with the same counter value.

Without transmission errors, the deskew frame counter used to determine the differential delay to be removed will be the lowest value used for the counter. If the process master PM misses to retrieve and/or validate the lowest value in one or more ODUk signals (e.g. because of bit errors), the delay may be determined based on any other counter value as long as the same value got received in all ODUk signals.

Although the timing snapshot information communicated is valid for the lowest value of the deskew frame counter only (as the timing is not forcefully locked afterwards by the process slave PS), it can be expected that no significant error will be made if a counter value other than the lowest one is used to determine the delay. That assumption still applies in use cases of an incorrectly configured bundle where individual members may not be timed from the same reference clock, thus somewhat falsifying the delay determined using counter values other than the lowest one.

Aside from retrieving the deskew frame counter providing a measure of differential delay accumulated between all signals transported over an OTN transport network with frame period accuracy, the process master PM can retrieve the relative FS delay value inserted by the process slave PS from each ODUk signal to determine the exact differential delay between the client signals CS.

Once the multiframe delay difference based on the deskew frame counter and the communicated relative FS delay at the time of timing snapshot are available, the process master PM as illustrated in FIG. 6 may determine the transport delay differences for any ODUk signal transporting the signals of a client signal bundle CSB.

The process master PM can use the transport delay differences determined to configure the deskew buffer extraction point for each ODUk signal of the client signal bundle CSB in such a way that the resulting FS signal/MFAS value timing relationship will be identical to the one present at the process slave PS at the time of taking the timing snapshot.

After configuring the deskew buffer as required, the process master PM as illustrated in FIG. 6 stops communicating the request REQ to deskew. Once the process master PM receives no more acknowledgement ACK for any client signal CS of the client signal bundle CSB, it enables traffic transport again.

Figure 7:
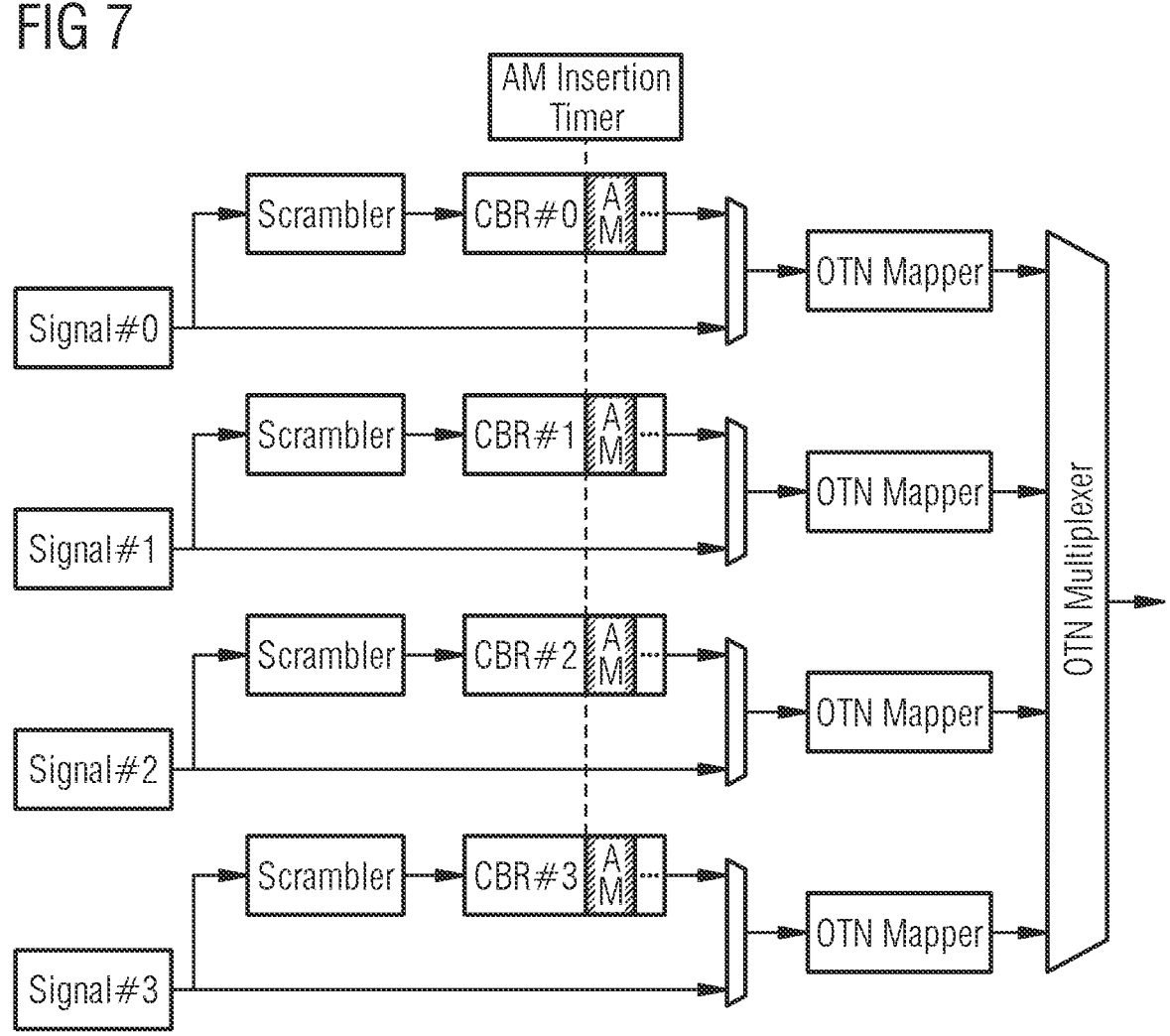
FIG. 7 shows a block diagram for illustrating the operation behaviour of a process slave in a possible exemplary embodiment of an optical transport network according to the present invention.
Figure 8:
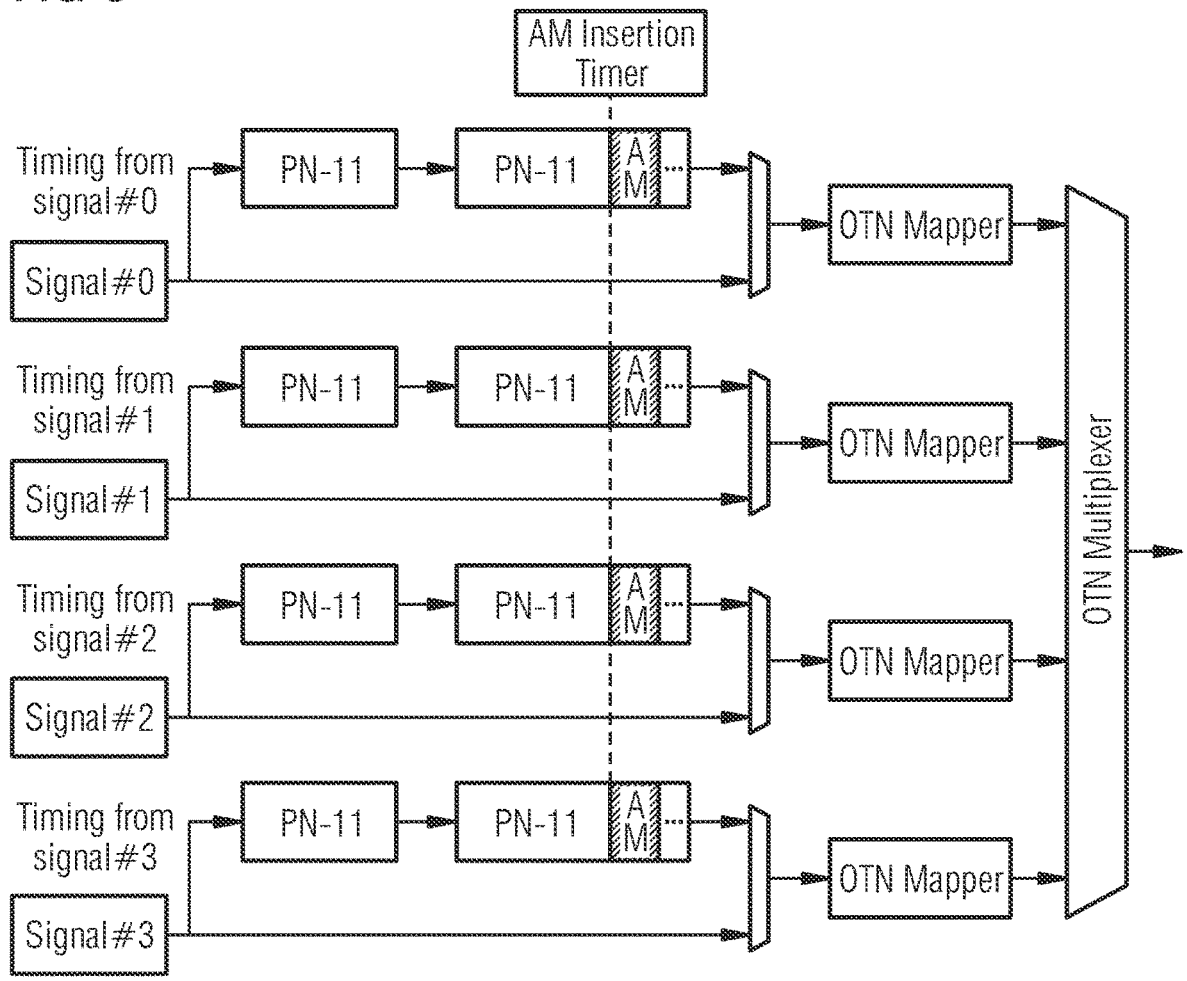
FIG. 8 shows a block diagram for illustrating the operation behaviour of a process slave in a further possible exemplary embodiment of an optical transport network according to an aspect of the present invention.
Figure 9:
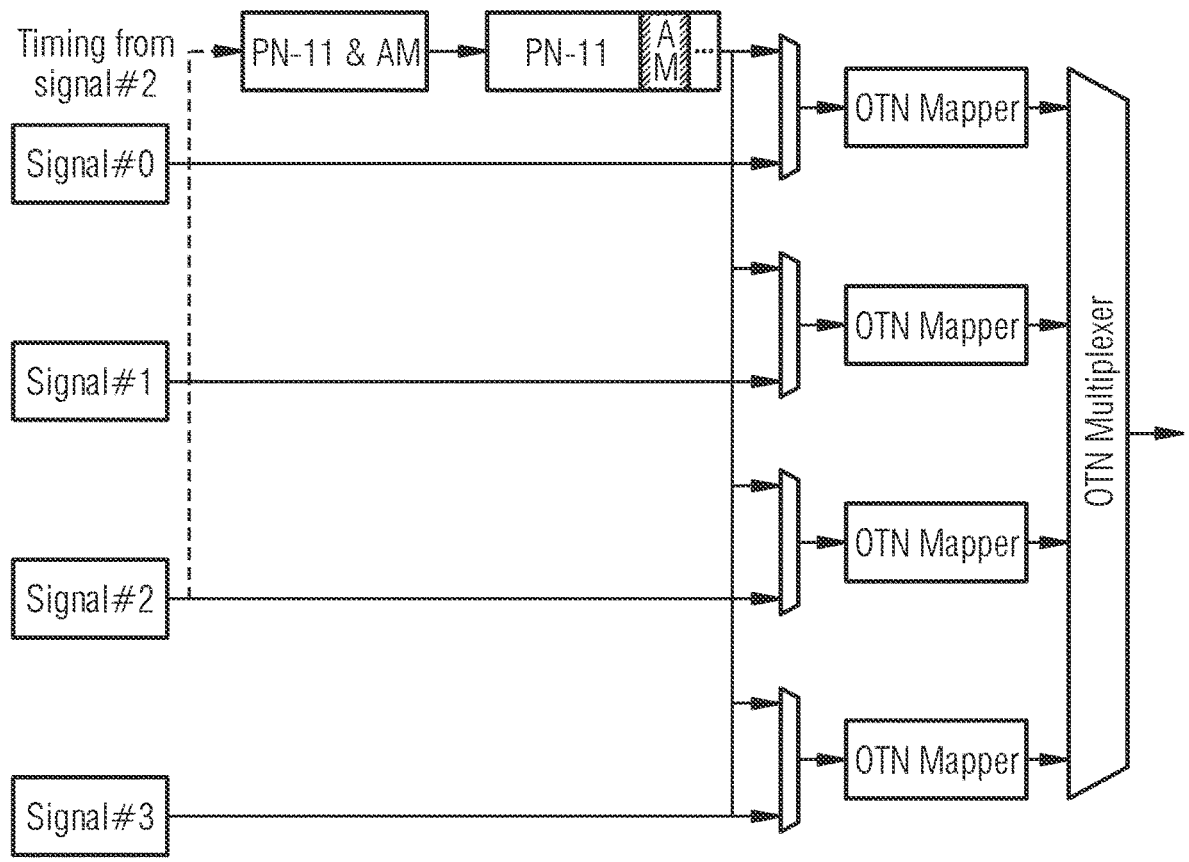
FIG. 9 shows a block diagram for illustrating the operation behaviour of a process slave in a further exemplary embodiment of the optical transport network according to an aspect of the present invention.

FIGS. 7, 8, 9 illustrate the operation behaviour of different implementations of a process slave PS in a further possible embodiment of the method and network according to the present invention.

Figure 10:
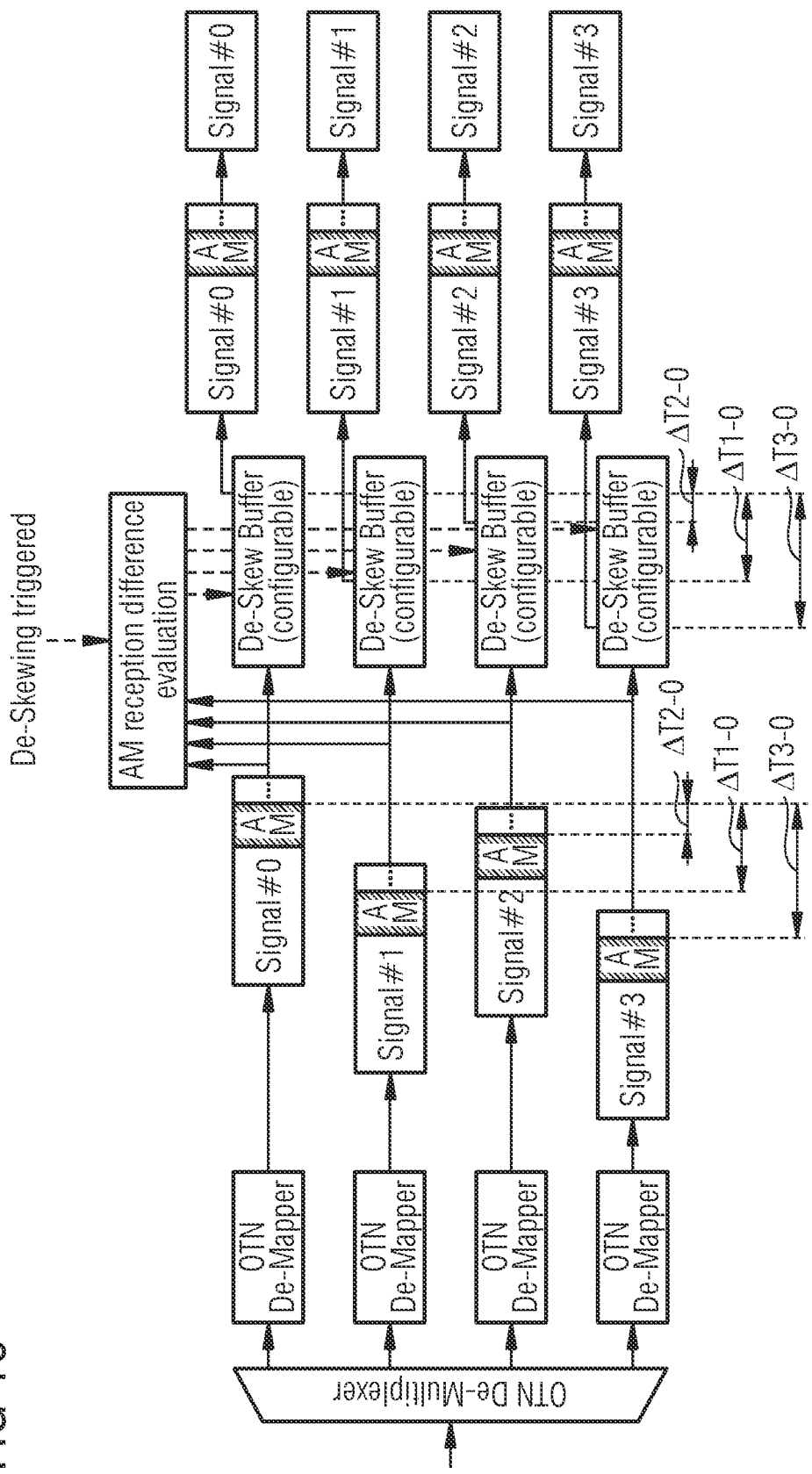
FIG. 10 shows a further block diagram for illustrating the operation behaviour of a process master in a further possible exemplary embodiment of the optical transport network according to an aspect of the present invention.

FIG. 10 shows the corresponding operation behaviour of the process master PM for this embodiment. In this embodiment, the client signals CS of a client signal bundle CSB can be replaced for the duration of the deskewing process by a replacement signal including cyclically inserted alignment markers AM. The alignment markers AM need to be defined such that they can be easily distinguished from the remaining signal.

All the client signals CS of a client signal bundle CSB can be replaced. This embodiment can be applied only if the process master PM does interrupt traffic transport for the duration of the deskewing process.

A possible implementation to achieve such differentiation can be to replace the signals bundled by a PRBS replacement pattern such as the PN-11 defined in ITU-T G.709 or to scramble the client signal data, if it is not scrambled already. Other methods may ensure that the used alignment marker AM may be easily distinguished from any possible traffic pattern. This embodiment is applied to client signals prior to being mapped in contrast to the previous embodiments being applied after BMP mapping. It can include any differential transport latency added by the mapping/demapping processes. In addition, this embodiment can be applied to any kind of mapper/demapper, i.e. synchronous mapper as well as asynchronous mapper. In this embodiment, the timing of the replacement signal (including alignment marker AM inserted) can be derived from the replaced client signal CS.

FIGS. 7, 8, 9 show alternative embodiments of a process slave PS used in an embodiment where the timing relationship is achieved by inserting alignment markers AM (upon deskewing).

Once a process slave PS determines a valid request REQ to deskew from the process master PM, it can replace all client signals bundled by a signal including cyclically repeated alignment markers.

The alignment marker repetition rate is chosen in a preferred embodiment such that the period of time between alignment markers AM will be at least twice the maximum amount of skew the method according to the present invention shall be capable of deskewing.

Three exemplary embodiments for alignment marker insertion are illustrated in FIGS. 7, 8, 9.

In a first embodiment, the signal transported is scrambled and alignment marker insertion is started with the next bit period in each signal path upon being triggered by the alignment marker insertion timer. While insertion of the next bit period can be beneficial as it provides the best accuracy, any other identifiable position shared between all client signals CS—e.g. the start of the next 66b block code—may be just as applicable.

In the second embodiment as illustrated in FIG. 8, the same replacement as in the embodiment of FIG. 7 is applied but in the embodiment shown in FIG. 8, the signal transported is replaced altogether by a replacement pattern (PN-11) where the alignment marker AM inserted if triggered by an alignment marker insertion timer.

Deriving the timing from each client signal CS while inserting the alignment marker AM in a synchronized fashion from a central trigger source assures that in use cases of incorrect configurations of a client signal bundle CSB (e.g. the client signals may be timed from different reference clocks), the process master PM can still rely on a common timing relationship between the alignment markers AM received in each signal.

In a further third embodiment as illustrated in FIG. 9, a single replacement pattern with an alignment marker AM inserted can be generated which is then used to replace all transported signals. The timing of the replacement pattern can be derived in a possible embodiment from one reference signal in this embodiment as shown in FIG. 9.

Replacing all signals with a replacement pattern timed from a single clock source assures that in use cases of incorrect configurations of a client signal bundle CSB (i.e. the signals may be timed from different reference clocks), the process master PM can still rely on a common timing relationship between all the signals received as would be the case for synchronized signals.

By replacing signal data with an alignment marker AM in a synchronized fashion (with or without replacing the entire signal data), an identifiable timing relationship between the signals bundled in a client signal bundle CSB can be established prior to any applied mapping.

The first exemplary embodiment as illustrated in FIG. 7 has the advantage that it can be implemented quite easily.

Replacing the client signals CS in full or partially for the duration of the deskewing does not impact traffic transport more than the preferred embodiment of the process master PM disabling traffic transport in direction of the connected equipment does anyhow.

The process slave PS replaces the signals before starting to communicate the acknowledgement ACK to the process master PM. It will do so as the process master PM does rely on an aligned timing relationship being present at the time of receiving the acknowledgement ACK in order to carry out the deskewing successfully.

The process slave PS maintains replacement pattern/alignment marker insertion as applicable for as long as it receives the request REQ to deskew from the process master PM.

Once the process slave PS no longer receives the request REQ to deskew at any signal of the client signal bundle CSB, it can release the timing lock (if applied) as well as signal replacement and does stop communicating the acknowledgement ACK.

FIG. 10 illustrates the operation behaviour of a process master PM in the embodiment using alignment marker insertion.

Once the process master PM as illustrated in FIG. 10 receives an acknowledgement ACK at all signals of the client signal bundle CSB it requested the deskewing for, it may determine the timing relationship present between the client signals CS. The process master PM can determine the amount of delay to remove the relative difference from the alignment marker positions received.

As the process slave PS did synchronize the alignment marker upon insertion, any time difference in the reception of alignment markers AM between signals determined by the process master PM form a direct measure of the differential delay between the client signals CS of a client signal bundle CSB accumulated because of their transport via the OTN transport network.

The process master PM illustrated in FIG. 10 can use the differential delay determined to configure the deskew buffer extraction point for each client signal CS of the client signal bundle CSB in such a way that the alignment markers AM of all signals will be synchronized again at the egress of the deskew buffer thus matching the timing relationship as present at the process slave PS.

As long as the differential delay between signals does not exceed half the time between alignment markers AM, the process master PM can deskew signals as it is known which signals to delay and by what amount for all signals to be delayed in total by the same amount.

After having configured the deskew buffer as required, the process master PM illustrated in FIG. 10 does stop communicating the request REQ to deskew. Once the process master PM receives no more acknowledgement ACK for any client signal CS of the client signal bundle CSB, it can enable traffic transport again.

In a further possible embodiment, known timing relationship can be achieved by inserting alignment markers AM continuously. In this embodiment, the alignment markers AM can be inserted continuously regardless of a deskewing process having been triggered or not. As in this embodiment the alignment markers AM are constantly added to the client signal CS, the bandwidth required to transport the client signal data with the alignment markers AM added does increase. The level of increase of the bandwidth can be determined by the size and repetition rate of the alignment markers AM inserted. As in this embodiment the alignment markers AM are continuously inserted, communication between a process slave PS and a process master PM is no longer required as the process slave PS can continuously operate. However, communicating information about the signal bundle size and identifier configured at the process slave PS can be beneficial to be able to determine a configuration mismatch condition. Furthermore, for this embodiment to be tolerant for configuration mistakes (i.e. not all client signals CS of a client signal bundle CSB being timed from the same reference clock) a similar handshaking between a process slave PS and a process master PM can be beneficial as it may allow the process slave PS to ensure resynchronization of alignment marker insertion if required upon the deskew process being applied.

Since in this embodiment the alignment markers AM are continuously inserted, the communication data can be passed as part of the alignment marker definition instead of using bytes from the OPU overhead as required for other embodiments.

Figure 11:
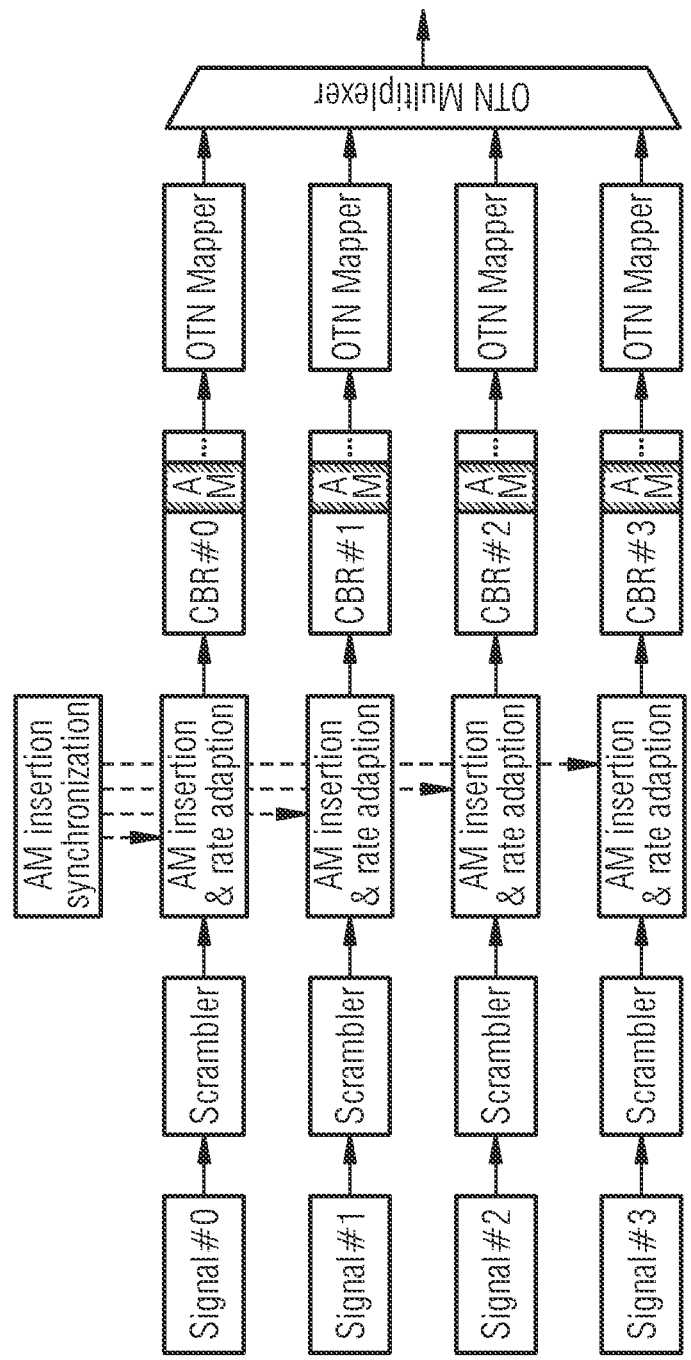
FIG. 11 shows a block diagram for illustrating the operation behaviour of a process slave in a further possible exemplary embodiment of an optical transport network according to an aspect of the present invention.

FIG. 11 shows the operation behaviour of a process slave PS for the embodiment using a continuous alignment marker insertion. In the illustrated embodiment, the process slave PS (i.e. the process source function) can scramble the signal data to ensure that the alignment markers AM inserted are easily identified from any possible present client signal data pattern.

Scrambling may not need to be applied if the client signal CS is already scrambled and it can be assured that no pattern may occur which may be falsely identified as an alignment marker AM.

In the illustrated embodiment of FIG. 11, the alignment markers AM are continuously inserted cyclically in a synchronized fashion to any of the signals deskewing shall be supported for. The repetition rate of the alignment marker insertion can be chosen such that the bandwidth increase does not impact the mapping efficiency and provides sufficient deskewing capabilities (i.e. time between alignment marker AM being at least twice the maximum skew to be removed).

Insertion of the alignment marker AM can be synchronized by a central alignment marker insertion timer or the alignment markers AM may be inserted after a specified amount of signal bits with the initial insertion being synchronized between all bundled client signals.

Figure 12:
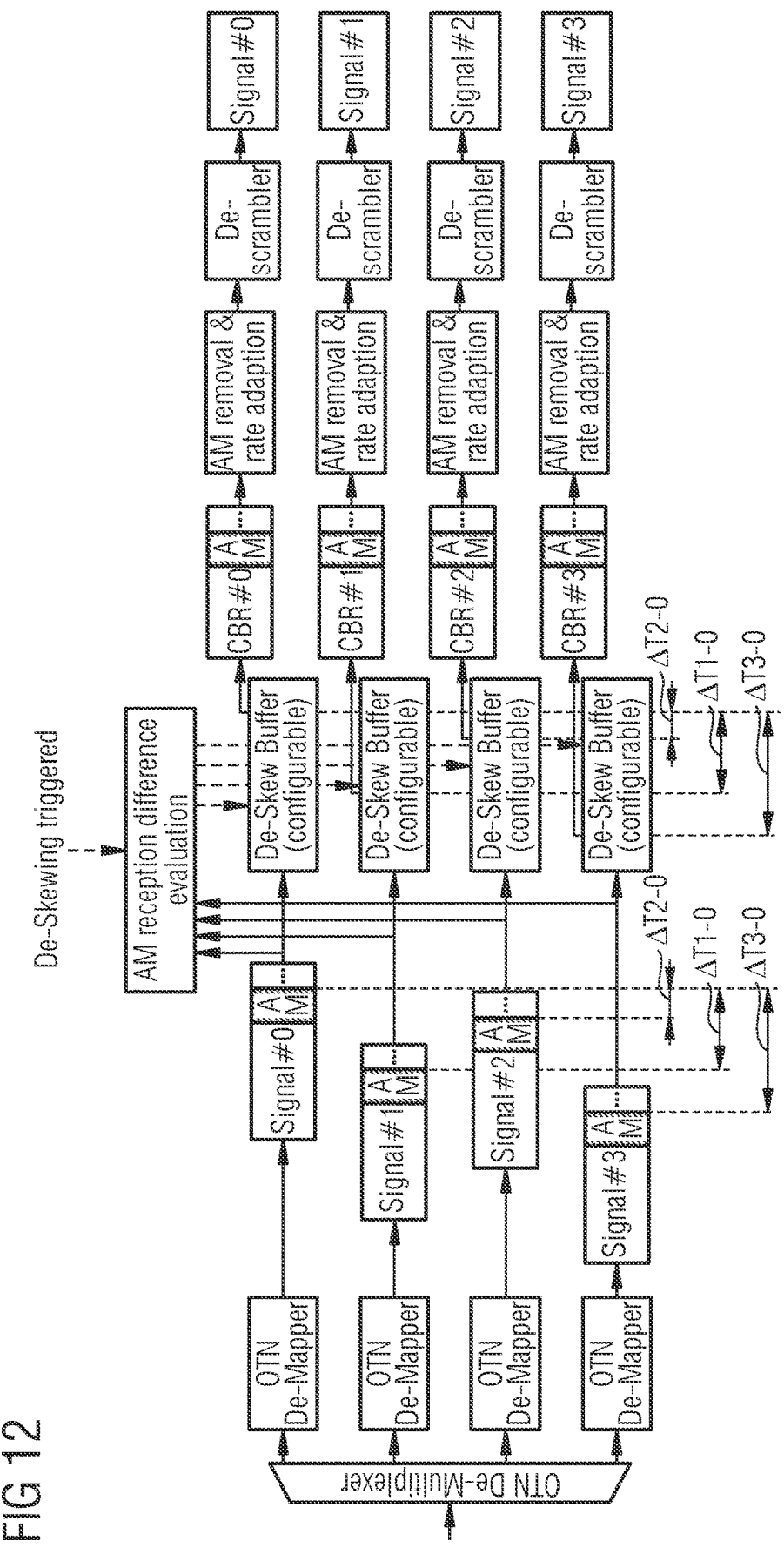
FIG. 12 shows a block diagram for illustrating the operation behaviour of a process master in a further exemplary embodiment of an optical transport network according to a further aspect of the present invention.

If the alignment marker insertion is triggered by a central alignment marker insertion timer, the alignment marker insertion can stay synchronized regardless of the bundle signals being timed from the same reference clock or not. Thus, the embodiment as illustrated in FIG. 11 and FIG. 12 can form a preferred embodiment in some use cases. However, this embodiment requires a complex rate adaption process to maintain proper signal timing.

If alignment marker insertion is triggered by some client signal bit count, a once synchronized alignment marker insertion can stay synchronized if all bundled client signals are timed from the same reference clock. However, in case of incorrect configurations, the clock offset difference of differing reference clocks can quickly lead to the synchronization being lost. In such a case, a constant resynchronization or a synchronization at the time of the deskewing process may be required (the latter requiring communication between process master PM and process slave PS).

If it shall be ensured that the alignment markers AM are synchronized at the time of deskewing being applied by the process master PM, the same handshaking as described in the other embodiments may be used in this embodiment if the alignment marker insertion synchronization is not triggered by an alignment marker insertion timer.

Upon the process slave PS receiving the request REQ to deskew, it can resynchronize the alignment marker insertion between all client signals CS of a client signal bundle CSB and communicate an acknowledgement ACK to the process master PM afterwards. Once the process slave PS no longer receives the request REQ to deskew, it does stop communicating the acknowledgement ACK.

As the insertion of the alignment marker AM will increase the amount of data to transport, the signal rate needs to be adapted between the ingress of the alignment marker insertion and the egress of the alignment marker insertion.

The accuracy of the deskewing will depend on the accuracy of the alignment marker insertion synchronization. Thus, it is beneficial to insert the alignment marker AM at each signal path with the next bit period upon being triggered. However, other ways of insertion (e.g. inserting with a next 66b block code in 66b encoded signals) are possible as well.

FIG. 12 illustrates the operation behaviour of a process master PM in the embodiment using continuous alignment marker insertion.

As the alignment markers AM are continuously inserted in this embodiment, the communication between the end inserting the alignment markers (i.e. the process slave PS) and the end retrieving them and carrying out the deskewing (i.e. the process master PM) is not mandatory.

However, adding communication may be beneficial as it may allow to identify bundle configuration mismatches as well as dealing with incorrect bundle configurations where not all client signals CS may be timed by the same reference clock.

Regardless of deskewing being triggered or not, the process master PM as shown in FIG. 12 does continuously remove the alignment markers AM inserted by the process slave PS from the data stream. The process master PM does carry out rate adaption as required to recover the original signal timing and descramble the signal if it got scrambled.

As a result, the correct signal to transport is recovered at the correct timing.

As the process slave PS has inserted the alignment markers AM in a synchronized fashion, any time difference in the reception of alignment markers AM between signals determined by the process master PM form a direct measure of the differential delay between the client signals CS of a client signal bundle CSB accumulated because of the transport via the OTN transport network.

The process master PM as illustrated in FIG. 12 can use the differential delay determined to configure the deskew buffer extraction point for each client signal CS of the client signal bundle CSB in such a way that the alignment markers AM of all client signals can be synchronized again at the egress of the deskew buffer thus matching the timing relationship as present at the process slave PS.

As long as the differential delay between client signals CS does not exceed half the time between alignment markers AM, the process master PM as shown in FIG. 12 can deskew client signals as it is known which client signals CS to delay and by what amount for all client signals CS to be delayed in total by the same amount.

If it shall be ensured that the alignment markers AM are synchronized at the time of deskewing being applied by the process master PM, a similar handshaking as defined for the other embodiments may be used for this embodiment as well.

Upon being triggered, the process master PM can communicate a request REQ to deskew to the process slave PS. Once an acknowledgement ACK has been received, the process master PM can determine the skew between the client signals CS and can configure the deskew buffer before stopping to communicate the request to deskew again.

Communication between the terminating ends can be required for the above-described embodiments to support removal of differential delay accumulated by transporting bundled client signals individually and separately over an OTN network.

To avoid that intermediate standard compliant OTN transport equipment prevents a successful communication, in a preferred embodiment, bytes from the OPU OH (or OPU payload area) are allocated if it is not possible to allocate bytes as part of the data mapped. Allocating bytes from the ODU overhead may be possible at the risk of intermediate OTN equipment replacing their content thus preventing a successful communication. With these possible embodiments being applied to BMP mapped signals, the OPU OH bytes in frame column #15/frame row #1 . . . #3 are defined as reserved by ITU-T G.709 and may be used to carry out the required communication.

In addition, the OPU OH byte in frame column #16/frame row #4 defined to carry the Negative Justification Opportunity (NJO) may be used as well.

For BMP mapped signals, the NJO is defined to always carry a justification/stuff byte and the demapper is required to ignore its content.

In case of using an asynchronous AMP mapper, the OPU OH bytes in frame column #15/frame row #1 . . . #3 can be used the same way as for BMP mapper but the byte of the NJO must not be used as it is required to carry data bytes as well.

In case of use of a GMP mapper, only the OPU OH byte in frame column #16/frame row #4 may be used as all other bytes are required for the PSI byte and the 6 Justification Control (JC) bytes (JC #1 . . . JC #6). Thus, for GMP mapper, reserved bytes from the ODU overhead need to be allocated if the embodiment based on communicating a timing snapshot shall be applied. If any other embodiment is applied, allocating a single byte from the OPU OH can be sufficient.

Figure 13:
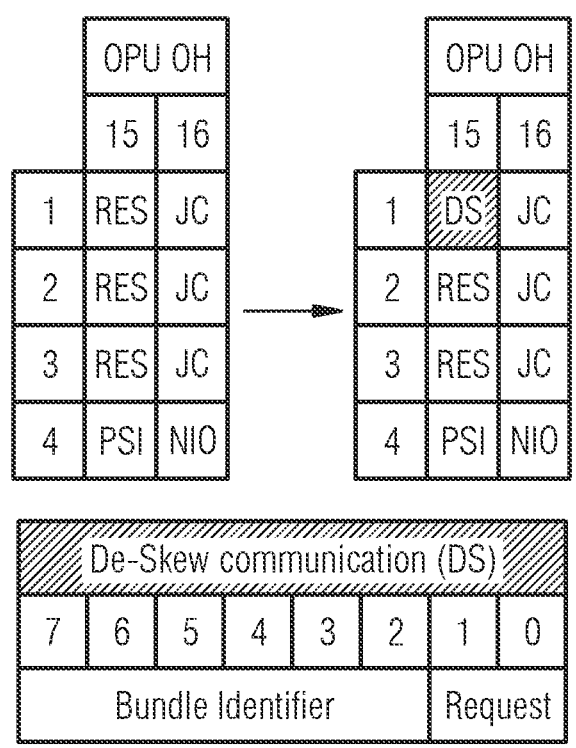
FIG. 13 shows a diagram for illustrating a communication overhead used in a possible exemplary embodiment of the method and optical transport network according to the present invention.

FIG. 13 shows a schematic diagram for illustrating an exemplary embodiment of a communication overhead used in the embodiment for achieving a known timing relationship by synchronizing FS/MFAS as also illustrated in FIGS. 3 and 4.

To support the embodiment based on synchronizing FS signal/MFAS value, a single byte from the OPU OH can be sufficient to communicate the request REQ to deskew, the denial and/or the acknowledgement ACK as well as the bundle identifier BID.

2 bits can be sufficient to code the request REQ to deskew, the denial as well as the acknowledgement ACK leaving 6 bits to code the bundle identifier BID thus supporting 64 signal bundles operating simultaneously (supporting a minimum of 128 signals to bundle) which is sufficient for almost all use cases. Any of the three reserved bytes of the OPU OH for BMP mapped client signals may be used to communicate the deskewing process information. The exemplary embodiment illustrated in context with FIG. 13 is based on the assumption that a BMP mapper is applied for mapping.

Other embodiments may use a differing coding and/or a different byte of an ODU frame to transport the information required.

It can be beneficial to choose a byte reserved in the OPU OH to communicate the deskew process related communication, e.g. the byte at frame column #15/frame row #1 in case that a BMP mapper is applied.

In a possible implementation, the coding of the request REQ communicated in bits [0:1] may be

[01]: Process master requesting the process slave to initiate the deskewing

[10]: Process slave acknowledging the request to initiate the deskewing

[11]: Process slave denying the request to initiate the deskewing

The bundle identifier BID value communicated only needs to be evaluated if accompanied with a non-zero request coding. Thus, a full range of 0 . . . 63 can be used to code the BID of 64 client signal bundles CSBs.

If no deskew process communication is required, the byte may be filled with an all-0 pattern as required by ITU-T G.709 for reserved bytes. The process master PM maps the coded content into the byte allocated for any ODUk signal a configured bundle is mapped into. The process slave PS maps the coded content into the byte allocated for any ODUk it retrieved a request REQ to deskew from.

In case that the deskewing capabilities shall be increased by adding a deskew frame counter as described before, a second byte of the OPU OH defined to be reserved by ITU-T G.709 may be allocated to transport an 8 bit, e.g. 0 . . . 239, counter.

To support the embodiment being based on communicating a timing relationship snapshot as described in context with FIGS. 5, 6, allocating at least three bytes to communicate the deskewing information required is beneficial.

As referred to before, three reserved bytes can be available in the OPU OH in case of BMP mapped signals. If the NJO byte is allocated in addition, four bytes are available from the OPU OH.

Depending on the specific implementation and coding, allocating fewer bytes may also suffice.

Three exemplary implementations for the communication are described here based on the assumption that a BMP mapper is applied. Two implementations make use of the three reserved bytes of the OPU OH whereas one implementation includes the NJO byte for a total of four bytes allocated for deskewing communication purposes.

Other implementations can use different coding, different amount of bytes and/or different bytes of an OPU frame to transport the required information.

FIG. 14 illustrates a first exemplary implementation of a communication overhead used in the timing snapshot embodiment.

In a first implementation, the three bytes of the OPU OH defined as reserved by ITU-T G.709 can be used to communicate the required information, e.g.

2 bits coding the request to deskew, denial and acknowledgement, 2 bits for the bundle identifier BID, 4 bits of frame deskew counter and 16 bits of coded relative FS delay (supporting delay values with 2 bit timing resolution).

If no deskew process communication is required, all bytes can be filled with an all-0 pattern as applicable for reserved bytes.

In a further second implementation, the fact that the process slave PS determines the bundle validity may be leveraged to define some dual-use of bytes, thus allowing to communicate more information using the same three reserved bytes of the OPU OH.

Figure 15:
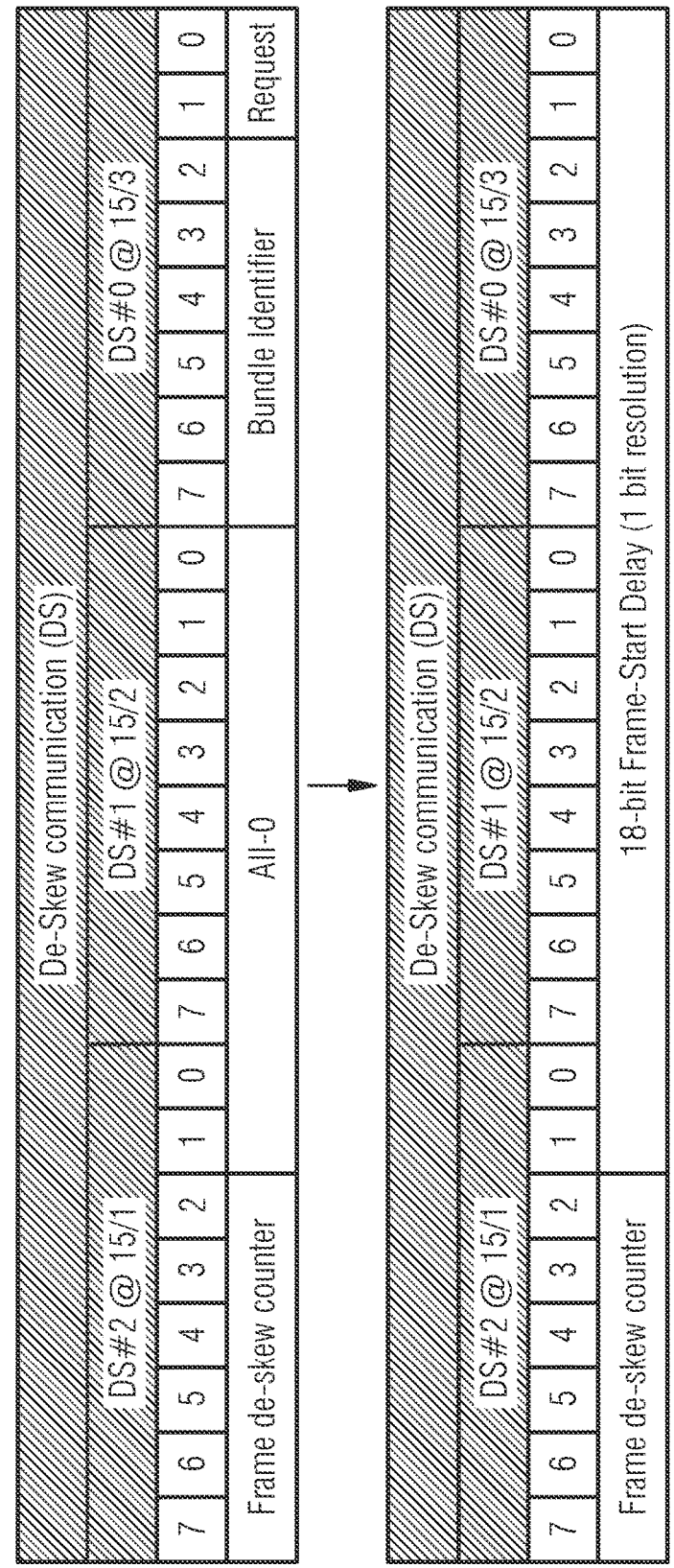
FIG. 15 shows a schematic diagram for illustrating a communication overhead used by a further exemplary embodiment of the method and optical transport network according to the present invention.

FIG. 15 illustrates this second exemplary implementation of the communication overhead used in the timing snapshot embodiment.

The bit field allocated for the frame deskew counter can be used to determine the content/structure of the remaining bit field of the deskew communication bytes.

Frame deskew counter=0
2 bits coding the request to deskew or denial and
6 bits of BID
Frame deskew counter >0
6 bits for frame deskew counter and
18 bits of coded frame start delay value
(supporting to code the delay values with 1 bit resolution).

If no deskew process communication is required, the bytes can be filled with an all-0 pattern as required by ITU-T G.709 for reserved bytes.

In contrast, if deskew process communication is required, the process master PM may use one byte to communicate the request REQ to deskew as well as the bundle identifier BID (if supported).

In case that the process slave PS needs to communicate a denial, it may do so using the same coding as the process master PM to communicate the request REQ to deskew, i.e. an all-0 pattern except for the BID and denial coding.

In case that the process slave PS validated the request REQ to deskew from the process master PM, the acknowledgement ACK is indirect only.

In this implementation, the process slave PS now inserts a non-zero frame deskew counter value followed e.g. by 18 bits of coded relative FS delay supporting the FS delay to be coded with a 1 bit resolution.

As the process slave PS can communicate the frame deskew counter and FS delay value only after successfully having validated the request REQ to deskew from the process master PM, the acknowledgement ACK and the bundle identifier BID need not be communicated explicitly.

The process master PM communicating the request REQ to deskew can monitor in this implementation whether a non-zero frame deskew counter is received to determine the acknowledgement ACK.

The process master PM can then retrieve and validate the frame deskew counter/FS delay values communicated.

Figure 16:
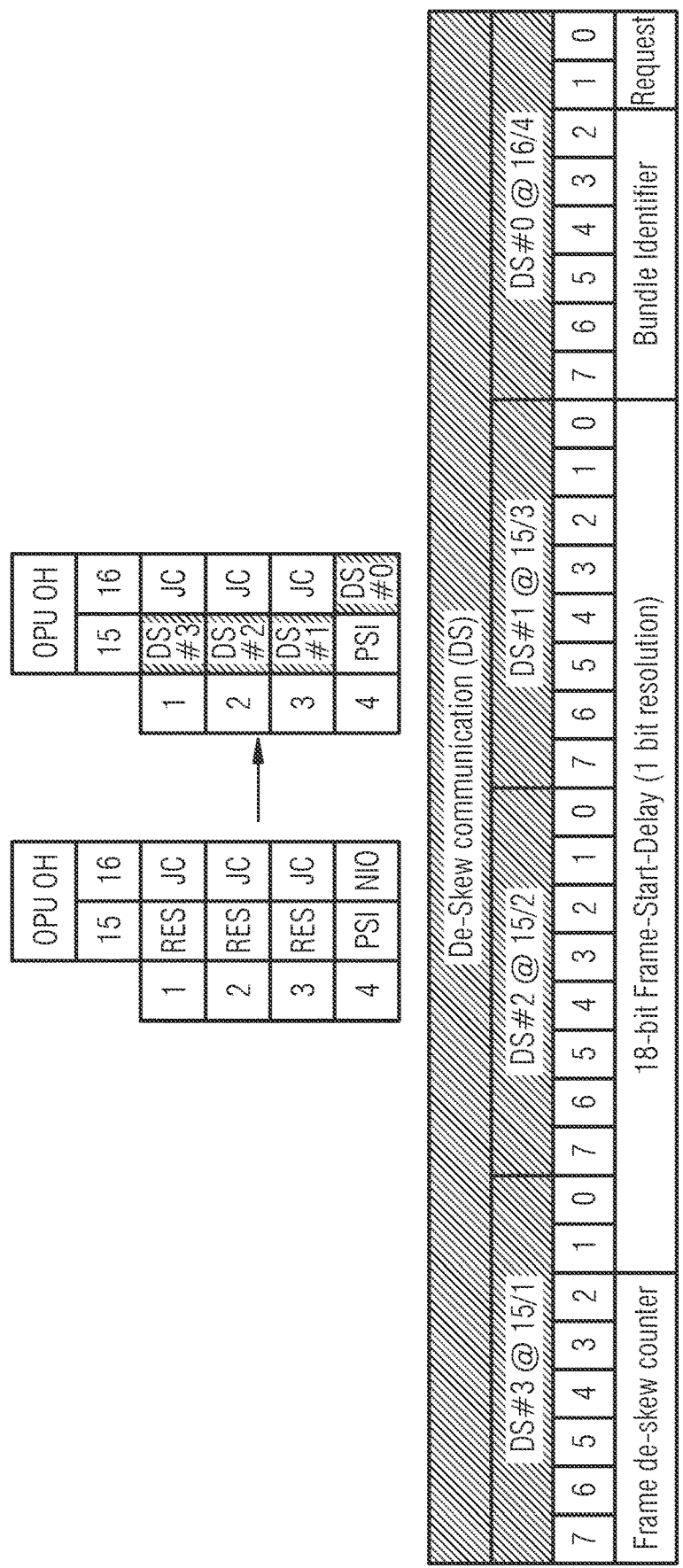
FIG. 16 shows a schematic diagram for illustrating a communication overhead used by a further exemplary embodiment of the method and the optical transport network according to the present invention.

In a further third implementation, the NJO byte of the OPU OH is allocated as well for deskew process communication purposes. In this third implementation as illustrated in FIG. 16, four bytes of the OPU OH are allocated. This allows to communicate any information required at the same time, e.g. 2 bits coding the request to deskew, denial and acknowledgement, 6 bits for the bundle identifier BID,
6 bits of frame deskew counter and
18 bits of coded frame start delay values (supporting to code the FS delay between any ODUk signal with 1 bit resolution).

If no deskew process communication is required, the bytes may be filled with an all-0 pattern as required by ITU-T G.709 for reserved bytes as well as the NJO byte for the BMP mapper containing a fixed stuff.

Whatever implementation is applied, the process master PM can map the coded content into the bytes allocated for any ODUk a signal of a configured client signal bundle CSB is mapped into. The process slave PS can map the coded content into the bytes allocated for any ODUk it retrieved a request REQ to deskew from.

Figure 17:
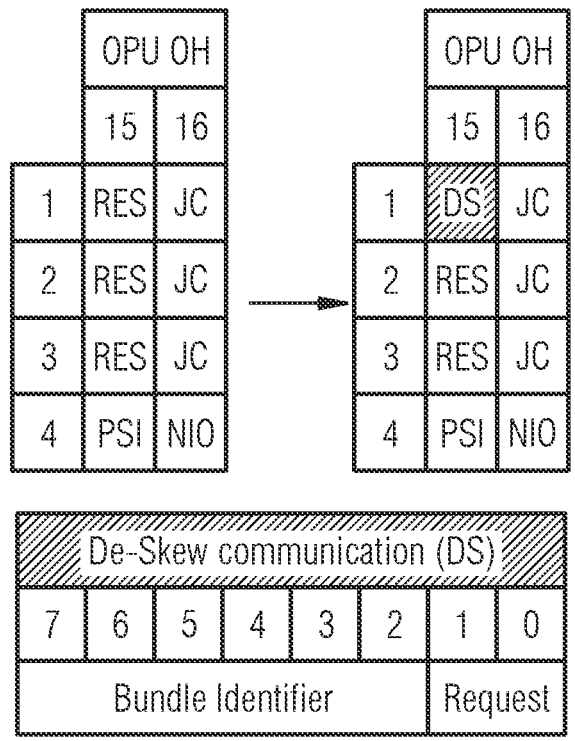
FIG. 17 shows a schematic diagram for illustrating a communication overhead used in a further exemplary embodiment of the method and optical transport network according to the present invention.

FIG. 17 shows an exemplary implementation of a communication overhead used in the alignment marker insertion embodiment described in context with FIGS. 7 to 10.

The deskew information of the alignment marker insertion based embodiment may either allocate a single byte from the OPU overhead or may be communicated as part of the alignment marker definition. The latter can apply to the embodiment with alignment marker AM continuously inserted in addition to the signal data transported.

To support the embodiment based on alignment marker insertion upon deskewing, the same OPU OH based communication as described for the embodiment based on FS/MFS synchronization can be used.

The exemplary implementation illustrated in FIG. 17 is a variant with a single reserved byte from the OPU OH of the BMP mapped signals being used. Other implementations may use a different coding and/or a different byte of the ODU frame to transport the required information.

The same coding of the request REQ communicated as described above can be applied as may be the coding of the BID value.

The process master PM maps the coded content into the byte allocated for any ODUk a signal of a configured bundle is mapped into. The process slave PS maps the coded content into the byte allocated for any ODUk it retrieved a request REQ to deskew from.

For the embodiments relying on the insertion of alignment markers AM, it can be beneficial to define the alignment marker AM in such a way that it has even parity.

Figure 18:
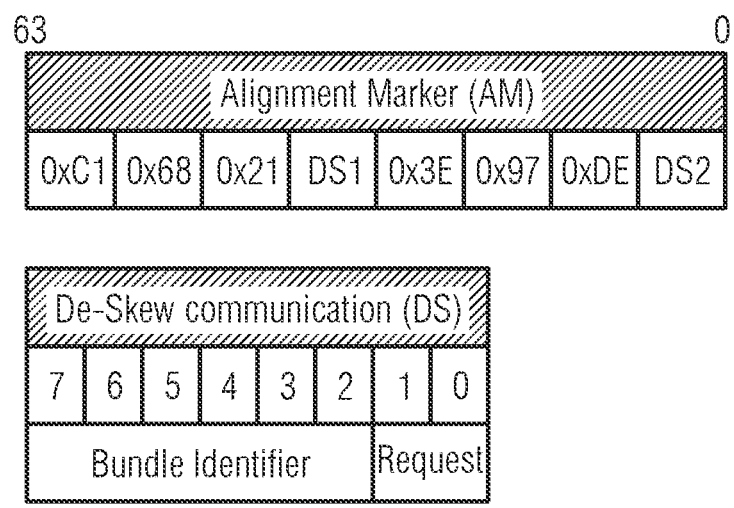
FIG. 18 shows a schematic diagram for illustrating an exemplary alignment marker definition used by a method and optical transport network according to the present invention.

An exemplary 64 bit long alignment marker AM is illustrated in FIG. 18. The last 4 bytes are the bit inverse of the first 4 bytes, therefore ensuring an even parity.

In the exemplary alignment marker AM illustrated in FIG. 18, the first 3 bytes (and their bit inverse) are defined such that they may be easily distinguished from PRBS pattern or scrambled data, thus being sufficient for the purpose of skew removal. The alignment markers AM shown are those of PCS lane #0 of a 100 GBASE-R signal as defined in IEEE802.3 Table 82-2.

As the alignment markers AM are used to determine skew between client signals CS suffering from transport latency differences only, there is no need to define multiple unique alignment markers as would be the case if the differing client signals need to be brought into a specific order again. The same alignment marker AM can be inserted for any client signal CS of a client signal bundle CSB or even between different client signal bundles CSBs.

However, defining multiple alignment markers AM may be beneficial as they may be used to identify/differentiate client signal bundles CSB (i.e. be used as an alternative to a bundle identifier BID being communicated).

A fourth byte (as well as its bit inverse) may include information which may be used to determine configuration mismatch conditions or to communicate requests and/or messages between process master PM and process slave PS, if required. For the latter to be applied, the alignment marker AM needs to be inserted continuously and not upon the deskewing process being triggered only.

The additional byte may be defined the same way as the communication using OPU overhead bytes.

In case of the alignment marker content being used to determine configuration mismatch conditions without a handshake communication as described above, it may be beneficial for the alignment marker AM to include the amount of signals bundled at the side where the alignment markers AM have been inserted.

That way, the receiving end can easily determine whether the local configuration matches the one of the transmitting end as it may compare bundle sizes and whether it receives proper BID values (or alignment markers) on the same signals locally configured to be part of a specific client signal bundle CSB.

There are multiple options to include a bundle size of a client signal bundle CSB, e.g. define multiple alignment markers AM to act as BID and use the bits shown above for BID to code the bundle size.

Whether one byte may be sufficient for BID and bundle size (the request bits may or may not be required any longer) or whether additional bytes may be added depends on the application and/or use case.

In a possible implementation, the bits defined for the BID may be used for the bundle size instead and multiple alignment markers AM may be defined to act as BID.

Any other alignment marker definition with fewer and/or more or other bytes to identify the alignment markers AM can be used as well.

FIGS. 1 to 18 illustrate four main embodiments for removing static differential delays resulting from an independent transport of client signals CS of a client signal bundle CSB and possible implementations of the communication used by the different embodiments.

The different embodiments of the method for removing static differential delays can be implemented in an optical transport network OTN according to the second aspect of the present invention. The optical transport network OTN according to the second aspect of the present invention comprises OTN mappers as well as OTN demappers. The OTN mappers are adapted to map received client signals CS of a client signal bundle CSB to ODU signals transported to OTN demappers of the same OTN network adapted to demap the ODU signals back to client signals CS. In the optical transport network OTN according to the second aspect of the present invention, a process slave PS at the OTN mapper end of said OTN network is configured to supply continuously or in response to a received request REQ information from timing relations between the client signals CS of said client signal bundle CSB to a process master PM at the OTN demapper end of said OTN network used by the process master PM to remove static differential delays between the client signals CS of the respective client signal bundle CSB. In a possible embodiment, the client signals CS are provided by client equipment of the OTN network.

The invention claimed is:

1. A method for removing static differential delays resulting from an independent transport of the client signals, CS, of a client signal bundle, CSB, through an optical transport network, OTN, which comprises OTN mappers mapping received client signals to ODU signals transported to OTN demappers demapping received ODU signals to client signals, CS,
wherein a process slave, PS, at the OTN mapper end of said OTN network supplies continuously or in response to a received request information about timing relations between the client signals, CS, of said client signal bundle, CSB, to a process master, PM, at the OTN demapper end of said OTN network used by the process master, PM, to remove the static differential delays between the client signals, CS, of the respective client signal bundle, CSB.

2. The method according to claim 1 wherein the process master, PM, at the OTN demapper end of said OTN network generates a deskew request, REQ, communicated by the process master, PM, at the OTN demapper end of said OTN network to the process slave, PS, at the OTN mapper end of said OTN network.

3. The method according to claim 2 wherein the process slave, PS, at the OTN mapper end of said OTN network provides in response to the deskew request, REQ, received from the process master, PM, at the OTN demapper end of said OTN network an acknowledgement, ACK, comprising information about timing relations between alignment markers, AM, associated with the client signals, CS, of the client signal bundle, CSB, communicated by said process slave, PS, to said process master, PM.

4. The method according to claim 3, wherein the static differential delays between the client signals, CS, of the respective client signal bundle, CSB, are removed by the process master, PM, in response to the received acknowledgement, ACK, on the basis of the timing relation between the alignment markers, AM.

5. The method according to claim 2 wherein the generation of the deskew request, REQ, by the process master, PM, at the OTN demapper end of said OTN network is triggered autonomously by an event detected at the OTN demapper end of said OTN network or triggered by a user request.

6. The method according to claim 2 wherein the process master, PM, at the OTN demapper end of said OTN network stops sending the deskew request, REQ, after the removal of the static differential delays has been performed by the process master, PM.

7. The method according to claim 1 wherein the client signals, CS, form part of a configured client signal bundle, CSB, identified by a bundle identifier, BID, carried in the deskew request, REQ.

8. The method according to claim 3 wherein the process slave, PS, provides the acknowledgement, ACK, if the received deskew request, REQ, has been determined by the process slave, PS, to form a valid deskew request, REQ.

9. The method according to claim 1 wherein the process master, PM, disables transport of client signals, CS, forming part of the respective client signal bundle, CSB, as long as the acknowledgement, ACK, is received by the process master, PM.

10. The method according to claim 2 wherein alignment markers, AM, forming part of the mapped ODU signals are synchronized to each other by the process slave, PS, in response to the received deskew request, REQ, before the acknowledgement, ACK, is provided by the process slave, PS, to said process master, PM.

11. The method according to claim 10 wherein the alignment markers, AM, comprise Frame Start Signal, FS, markers and/or a MultiFrame Start Signal, MFS, markers.

12. The method according to claim 1 wherein timing relations between the alignment markers, AM, of all client signals, CS, of a client signal bundle, CSB, mapped by the OTN mapper are determined by the process slave, PS, at the mapper end of the OTN network in response to a valid deskew request, REQ, received from the process master, PM, at the demapper end of said OTN network to generate a timing relation snapshot communicated by the process slave, PS, along with the acknowledgement, ACK, to the process master, PM, used to remove static differential delays between the respective client signals, CS.

13. The method according to claim 12 wherein the process slave, PS, at the OTN mapper end of said OTN network further communicates a deskew frame counter value to the process master, PM, at the OTN demapper end of said OTN network inserted in the ODU signals transporting a mapped client signal, CS, of the respective client signal bundle, CSB, to the OTN demapper of said OTN network.

14. The method according to claim 1 wherein portions of the client signals, CS, of the respective client signal bundle, CSB, are replaced before being mapped by the OTN mapper by the process slave, PS, at the OTN mapper end of said OTN network by inserted synchronized cyclically repeated alignment markers, AM, in response to a valid deskew request, REQ, received from the process master, PM, at the demapper end of said OTN network to establish identifiable timing relations between the client signals, CS, of the respective client signal bundle, CSB, used by the process master, PM, to remove static differential delays between the respective client signals, CS.

15. The method according to claim 1 wherein before mapping by the OTN mapper by the process slave, PS, at the mapper end of said OTN network regardless of receiving a valid deskew request, REQ, or not synchronized cyclically repeated alignment markers, AM, are inserted in addition to the data to establish identifiable timing relations between the client signals, CS, of the respective client signal bundle, CSB, used by the process master, PM, to remove static differential delays between the respective client signals, CS.

16. The method according to claim 2 wherein the deskew request, REQ, and the acknowledgement, ACK, are transported between the process master, PM, at the OTN demapper end of said OTN network and the process slave, PS, at the OTN mapper end of said OTN network in a communication channel using allocated bytes of the OPU overheads, the ODU overheads and/or the OTU overheads.

17. The method according to claim 1 wherein the client signals, CS, are provided by a client equipment comprising a signal switch or a signal router.

18. An optical transport network, OTN, comprising
OTN mappers adapted to map received client signals, CS, of a client signal bundle, CSB, to ODU signals transported to OTN demappers of said OTN network adapted to demap received ODU signals to client signals, CS,
wherein a process slave, PS, at the OTN mapper end of said OTN network is configured to supply continuously or in response to a received request, REQ, information about timing relations between the client signals, CS, of said client signal bundle, CSB, to a process master, PM, at the OTN demapper end of said OTN network used by the process master, PM, to remove static differential delays between the client signals, CS, of the respective client signal bundle, CSB.

19. The optical transport network, OTN, according to claim 18 wherein the client signals, CS, are provided by client equipment of said OTN network.

* * * * *